United States Patent [19]
Haneda et al.

[11] Patent Number: 5,255,014
[45] Date of Patent: Oct. 19, 1993

[54] IMAGE FORMING APPARATUS HAVING A HIGH γ PHOTORECEPTOR

[75] Inventors: Satoshi Haneda; Masakazu Fukuchi, both of Hachioji, Japan

[73] Assignee: Konica Corporation, Tokyo, Japan

[21] Appl. No.: 682,732

[22] Filed: Apr. 9, 1991

[30] Foreign Application Priority Data

| Apr. 12, 1990 | [JP] | Japan | 2-96685 |
| May 8, 1990 | [JP] | Japan | 2-118280 |
| May 29, 1990 | [JP] | Japan | 2-139138 |
| May 29, 1990 | [JP] | Japan | 2-139139 |

[51] Int. Cl.$^5$ ............................................. H04N 1/21
[52] U.S. Cl. ..................................................... 346/108
[58] Field of Search ................ 346/108, 160, 153.1; 358/296, 298, 300, 302

[56] References Cited

U.S. PATENT DOCUMENTS

| 5,017,944 | 5/1991 | Kitamura et al. | 346/108 |
| 5,025,272 | 6/1991 | Haneda et al. | 346/153.1 |

Primary Examiner—Mark J. Reinhart
Attorney, Agent, or Firm—Frishauf, Holtz, Goodman & Woodward

[57] ABSTRACT

The invention provides an apparatus for forming an image in which there is provided a photoreceptor includes an imaging surface for forming an electrostatic latent image thereon in response to an exposure light. The photoreceptor has a light decay characteristic so that the potential of the imaging surface is not decayed in an initial period of exposure and the potential of the imaging surface is sharply decayed in a middle period of exposure. A laser beam generator is used for scanning and exposing the imaging surface with a laser beam to write the latent image on the imaging surface. A generator drive circuit includes a signal generator for generating a reference wave signal and is adapted to receive an image density signal, to modulate the image density signal on the basis of the reference wave signal and to drive the laser beam generator in accordance with the modulated image density signal.

12 Claims, 22 Drawing Sheets

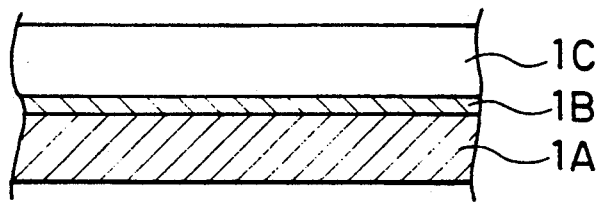
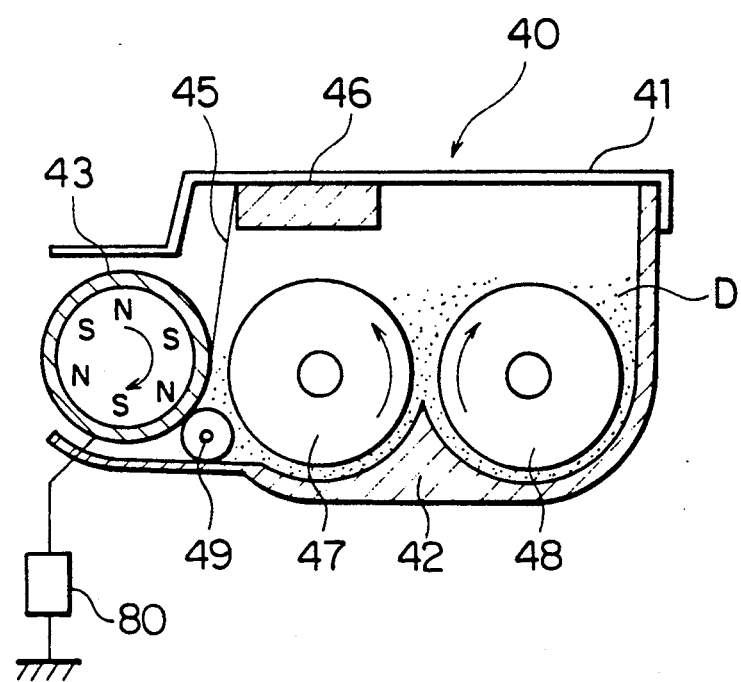

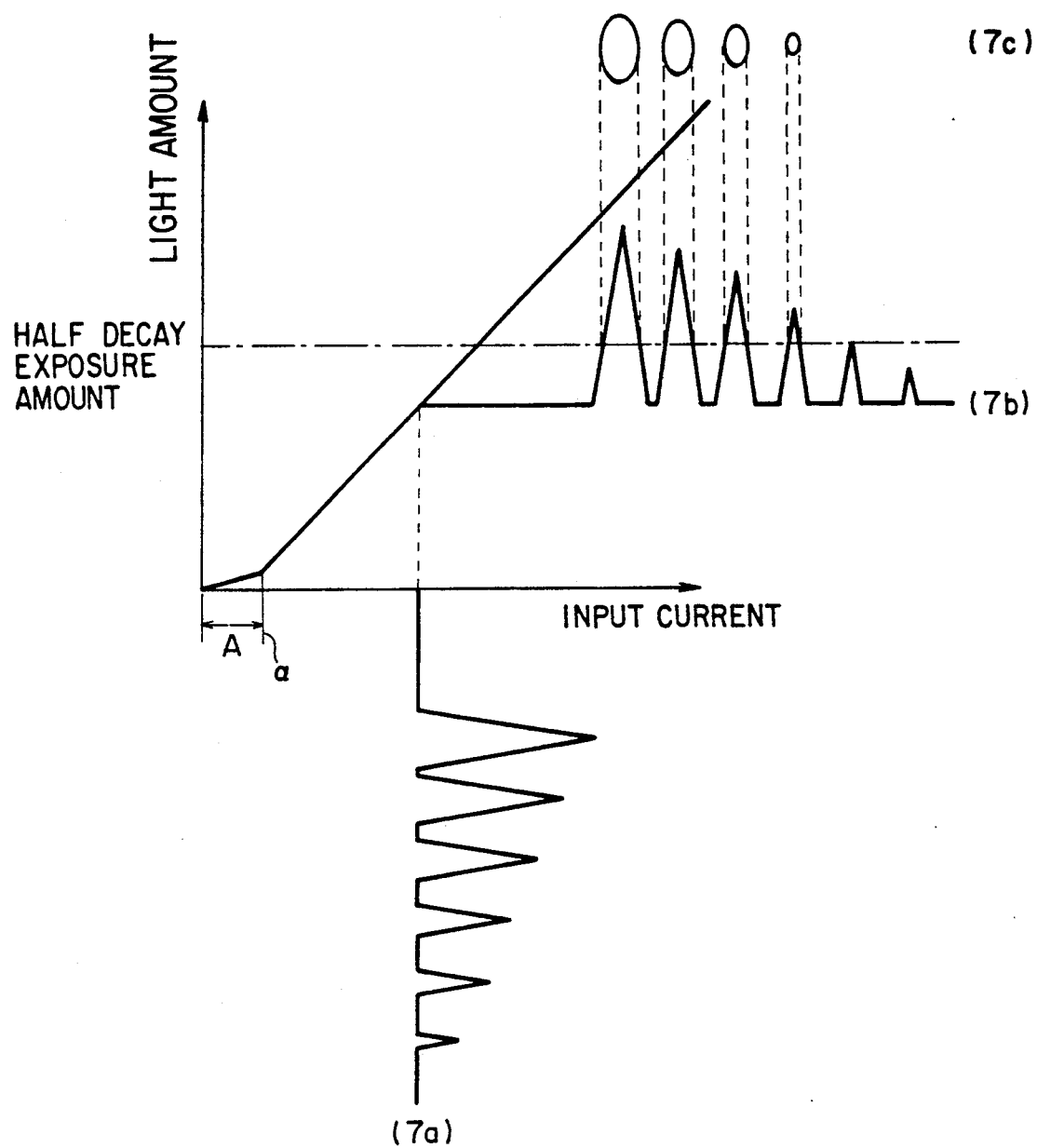

HIGH DENSITY
LOW DENSITY

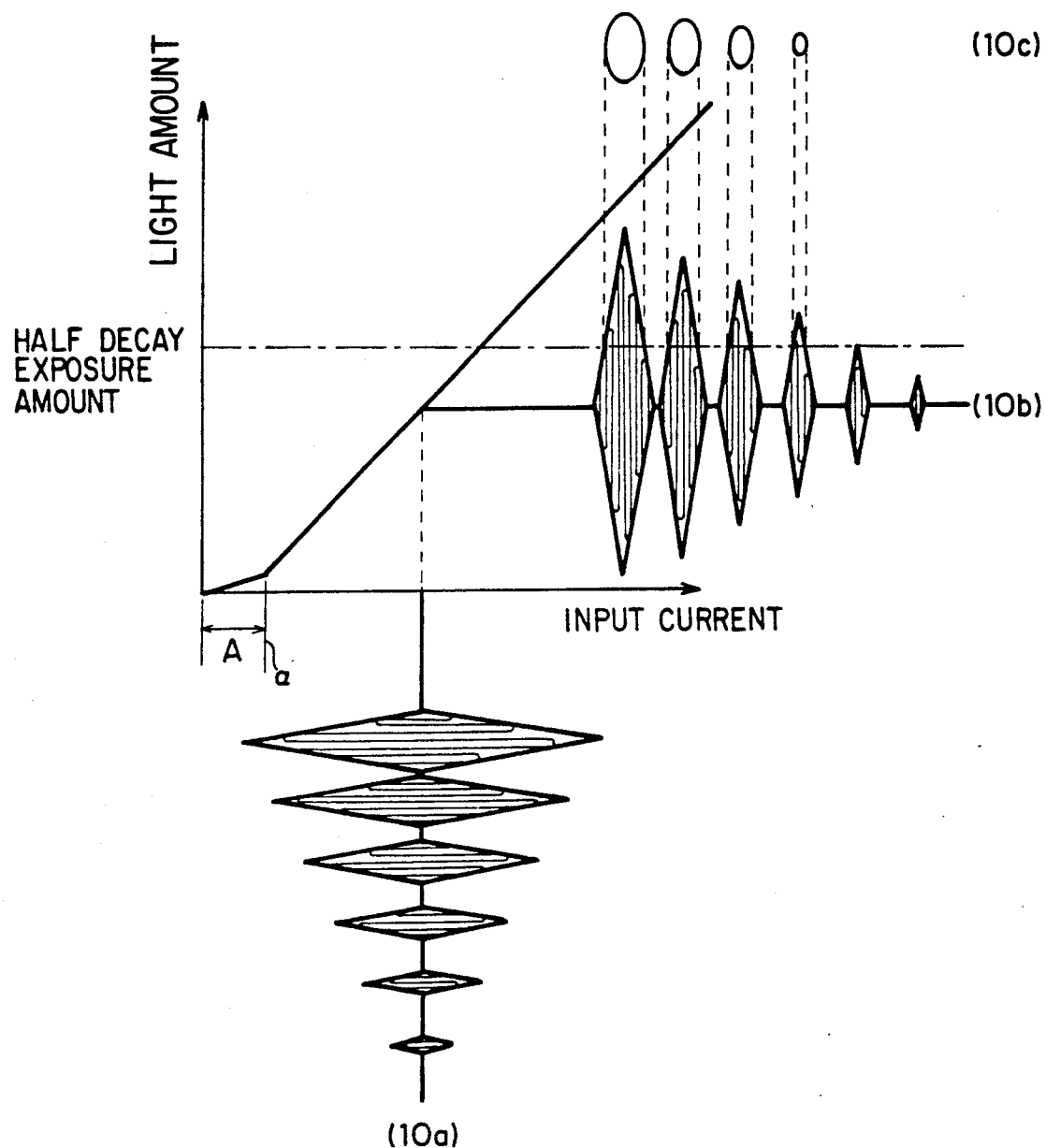

HIGH DENSITY
LOW DENSITY

FIG. 15a
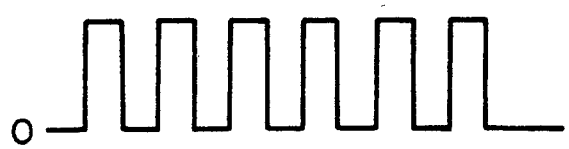
FIG. 15b
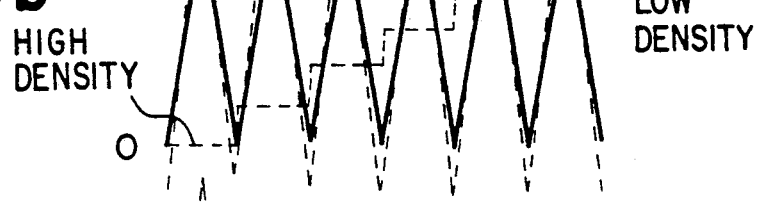
HIGH DENSITY
LOW DENSITY
FIG. 15c
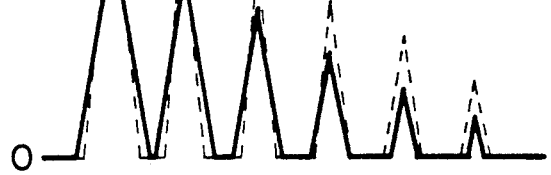
FIG. 15d
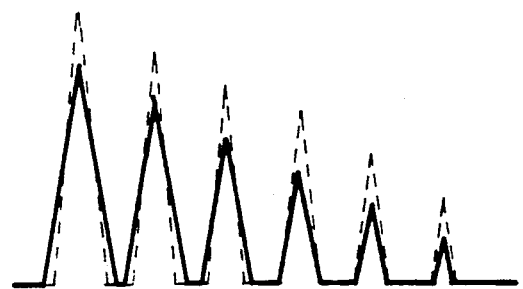
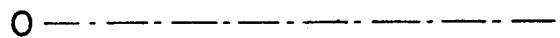

P ½

0

IMAGE FORMING APPARATUS HAVING A HIGH γ PHOTORECEPTOR

BACKGROUND OF THE INVENTION

The present invention relates to an electrophotographic image forming apparatus, and more particularly relates to an image forming apparatus which forms an electrostatic latent image on a photoreceptor by light exposure which has been beam-modulated according to digital image data sent from a computer.

Recently, in the field of electrophotography in which an electrostatic latent image is formed on a photoreceptor and the latent image is developed so that a visual image can be obtained, a digital system of image forming has been actively investigated by which improvement, conversion and editing of images are easily conducted so that image forming of high quality is possible.

By the aforementioned image forming method, each dot of an image is formed as follows: a dot-shaped exposure is conducted on a photoreceptor which has been uniformly charged, by light emitting elements such as a laser, a LED array, a liquid crystal shutter and the like, according to digital image signals sent from a computer or a copy document.

Concerning an optical scanning system in which optical modulation is conducted according to digital image signals, an apparatus has been proposed in which a semiconductor laser is utilized and a laser beam is directly modulated by the method of pulse-width modulation (Japanese Patent Application Open to Public Inspection 39976/1987).

The section of a beam which has been modulated by a digital image signal is circular or oval, and its luminance distribution is similar to a normal distribution, both foot ends of which are spread to the right and left. For example, in the case of a semiconductor laser beam, the luminance is usually 1–6 mW, and its sectional shape on a photoreceptor is a very narrow circle or oval of which one or both of the primary and subsidiary scanning lengths is 20–100 μm.

However, even when an electrostatic latent image formed by the aforementioned beam is preferably developed by the method of reversal development, the sharpness of the obtained image is low in many cases.

In the case of an apparatus in which multi-value modulation is conducted by the method of direct intensity modulation or pulse modulation, the change of beam intensity is small with regard to an initial driving current of a laser semiconductor, and the change tends to fluctuate due to environmental factors such as heat. Further, the linearity with regard to a drive current is not good and there is a problem in the response to a drive signal, so that it is necessary to compensate by improving its electrical circuit. Therefore, when intensity modulation or pulse-width modulation is used for a multi-value modulation method, it is difficult to conduct the intensity modulation or pulse-width modulation faster. Especially, in the case of the intensity modulation, the linearity is so inferior that it is difficult to put it to practical use.

The aforementioned problems are ascribed to: the sensitivity of a photoreceptor is generally high in the beginning of exposure, so that the fluctuation of a beam tends to be picked up and a sharp dot-shaped latent image can not be formed.

FIG. 2a is a schematic illustration which shows a characteristic of a low γ type of photoreceptor.

A low γ type of photoreceptor in which light decay is sharp in the beginning of exposure and gentle in the middle of exposure as shown in FIG. 2a, has been used as a photoreceptor which is applied to an electrophotographic image forming apparatus.

Concerning the low γ type of photoreceptor, the following have been widely known: a mono-layer type such as Se, CdS and the like; and a two-layer type composed of an electric charge generating layer and an electric charge conveyance layer, the two-layer type being used in usual Organic Photo Conductor. The light sensitivity of many of the photoreceptors which show the aforementioned semiconductor characteristic, is generally low in a low electric field, compared with a high electric field, and when the electric potential is lowered due to an increase in the amount of light, the sensitivity is lowered. For the reason described above, this type of photoreceptor is exclusively used in analog copiers in order to reproduce the gradation.

If an electrostatic latent image were formed on a low γ photoreceptor by beams emitted from the aforementioned optical scanning system, then a sharp dot-shaped latent image could not be formed because the sensitivity of the aforementioned photoreceptor is generally high in the beginning of exposure, so that the fluctuation of beams tends to be picked up.

Even when an electrostatic latent image formed by the aforementioned beams is preferably developed by the method of reversal development, the sharpness of the obtained image is low in many cases.

In order to solve the problems explained above, the inventors have developed an image forming method and an image forming apparatus, the characteristic of which is described as follows. A dot-shaped electrostatic latent image is formed by a beam sent from an optical scanning system on a photoreceptor (which will be called a high γ photoreceptor, hereinafter) having a light decay characteristic which is characterized in that: light decay does not occur in the beginning of exposure and light decay is sharp in the middle of exposure.

In the aforementioned image forming method and image forming apparatus, a high γ photoreceptor is adopted, so that the surface potential of the photoreceptor is not lowered until the amount of light reaches a predetermined value. Accordingly, an electrostatic image is not formed in the right and left foot-end portions of the beam. As a result, a sharp dot-shaped electrostatic latent image can be formed.

FIG. 2b is a graph showing the outline of the light decay characteristic of a high γ photoreceptor.

In the drawing, $V_1$ represents a charging potential, $V_0$ represents an initial potential at the beginning of exposure, L1 represents the light amount ($\mu J/cm^2$) of laser beam which is needed when initial potential $V_0$ decays to 4/5, and L2 represents the light amount ($\mu J/cm^2$) of laser beam which is needed when initial potential $V_0$ decays to 1/5.

A preferable range of the ratio $L_1/L_2$ is as follows.

$$1.0 \leq L_2/L_1 \leq 1.5$$

In this embodiment, $V_1 = 1000(V)$, $V_0 = 950(V)$, and $L_2/L_1 = 1.2$. The potential of the photoreceptor at exposed portion is 10 V.

The light sensitivity in a position corresponding to the middle period of exposure in which initial potential ($V_0$) is decayed to $\frac{1}{2}$, is defined as $E_{\frac{1}{2}}$, and the light sensitivity in a position corresponding to the initial period of exposure in which initial potential ($V_0$) is decayed to 9/10, is defined as $E_{9/10}$. Then, a photoconductive semiconductor giving the following relations is selected.

$$(E_{\frac{1}{2}})/(E_{9/10}) \geq 2$$

or preferably $$(E_{\frac{1}{2}})/(E_{9/10}) \geq 5$$

In this case, the photosensitivity is defined as an absolute value of potential lowering, with regard to a minute amount of exposure light.

As shown in FIG. 2b, the light decay curve of the photoreceptor 1 is characterized in that: the absolute value of a differential coefficient of the potential characteristics, which is light sensitivity, is small when the amount of light is small, and the absolute value is sharply decayed when the amount of light is increased. Specifically, as shown by the light decay curve in FIG. 2b, in the initial period of exposure, the sensitivity characteristic is low for a certain period $L_1$ and shows a gentle light decay characteristic. However, in the middle of exposure from $L_1$ to $L_2$, the characteristic curve becomes highly sensitive and a super high $\gamma$ characteristic is obtained in which the characteristic curve descends almost linearly. It can be considered that: specifically, the photoreceptor 1 obtains a high $\gamma$ characteristic utilizing an avalanche phenomenon under the condition of a high potential charging of $+500-+2000$ V. In other words, it can be considered as follows: in the initial period of exposure, the carrier generated on the surface of a photoconductive pigment is effectively trapped by a surface phase between the aforementioned pigment and a coating resin, so that light decay can be positively inhibited; and as a result, a sharp avalanche phenomenon occurs in the middle period of exposure.

It is a primary object of the present invention to provide an image forming apparatus in which a high $\gamma$ photoreceptor is utilized, and which is characterized in that: the response to a drive signal is improved; and the variation of beam intensity which varies according to environmental factors such as heat, is reduced so that a latent image can be stably formed.

In the image forming method and apparatus in which a high $\gamma$ photoreceptor is used, it is important to adjust the diameter of a dot because the diameter of a dot-shaped latent image is brought about by modulating an image signal by the method of intensity modulation or pulse modulation in order to reproduce a middle tone.

However, compared with a low $\gamma$ photoreceptor, a high $\gamma$ photoreceptor needs a large amount of exposure light in order to reduce a surface potential after the photoreceptor has been uniformly charged. When dot exposure is conducted by a minute diameter of light, the amount of light exposure is so small that a latent image can not be formed. Namely, there is a problem in that: the diameter range of a dot-shaped electrostatic latent image which is formed by an optical scanning system, is limited, so that there is a defect when a middle tone image is reproduced.

It is a secondary object of the present invention to form an image in which a middle tone is accurately reproduced by a dot-shaped latent image.

SUMMARY OF THE INVENTION

The aforementioned first object can be accomplished by an image forming apparatus which is characterized in that: an image is formed on a photoreceptor having a light decay characteristic by which the photoreceptor potential is not decayed in the initial period of exposure and sharply decayed in the middle period of exposure, by oscillating a semiconductor laser beam in accordance with a modulation signal obtained by modulating an image density signal with a reference wave signal, wherein a direct current component is included in a modulation signal corresponding to the white background of the aforementioned image density signal.

When the exposure intensity corresponding to the white background is approximately the same as, but not more than the half decay exposure, more effects can be provided.

Further, in the present invention, the intensity modulation of the aforementioned image density signal is conducted according to a reference wave signal.

In another embodiment of the present invention, a modulation signal is used which can be obtained in such a manner that: a high frequency signal is modulated by the method of amplitude modulation using a modulation signal which has been obtained by modulating the aforementioned image density signal with the reference signal.

Furthermore, in another embodiment, the aforementioned image density signal is modulated with the reference wave signal by the method of pulse modulation.

According to a preferable embodiment of the present invention, the maximum and minimum of the aforementioned image density signal is preferably inside the aforementioned reference wave signal.

Image control is preferably performed under the condition that the aforementioned reference wave signal is variable. In this case, when a preferable output of the aforementioned reference wave is obtained in accordance with the soft and hard gradation of the image, further effect can be provided.

The aforementioned second object is to provide an image forming method in which a modulated beam sent from the optical scanning system is irradiated on a high $\gamma$ photoreceptor so that a dot-shaped electrostatic latent image can be formed and reversal development is conducted. This method can be accomplished by uniformly illuminating the photoreceptor with light sent from an illuminating means before, after, or at the same time as the aforementioned modulation beam is illuminated.

In the case described above, the aforementioned modulated light is either light of intensity modulation or of pulse width modulation.

According to a preferable embodiment, the illuminating region by the aforementioned illuminating means is limited to an image forming region.

The amount of light illuminated by the aforementioned illuminating means can be changed.

The aforementioned second object can be accomplished by an image forming apparatus in which a modulated beam sent from the optical scanning system is illuminated on a high $\gamma$ photoreceptor so that a dot-shaped electrostatic latent image is formed and the aforementioned latent image is developed by the method of reversal development, and which is characterized in that: an illuminating means is provided which can uniformly illuminate the entire width of an image.

The illuminating region of the aforementioned illuminating means can be limited to an image forming region.

The aforementioned illuminating means is provided with a variable light illuminating means which changes the amount of illuminating light.

BRIEF DESCRIPTION OF THE DRAWINGS

FIG. 3 is a sectional view showing a specific structure of the high γ photoreceptor;

FIG. 4 is a sectional view of a developing unit which is applied to the image forming apparatus of the embodiment;

FIG. 7 is a schematic illustration which explains the relation of the amount of light emitted from a semiconductor laser according to an intensity-modulation signal which is level-shifted from the drive circuit of the first embodiment;

FIG. 10 is a schematic illustration which explains the relation of the amount of light emitted from a semiconductor laser according to an intensity-modulation signal which is level-shifted from the drive circuit of the second embodiment;

FIGS. 14a to 14d, 15a to 15d, and 16 are time charts and wave-form diagrams explaining a preferable embodiment according to the drive circuit shown in FIG. 5;

DETAILED DESCRIPTION OF THE PREFERRED EMBODIMENT

Referring now to the attached drawings, an embodiment of the present invention will be described as follows.

First, the structure of image forming apparatus 100 of the embodiment is explained.

Figure 1:
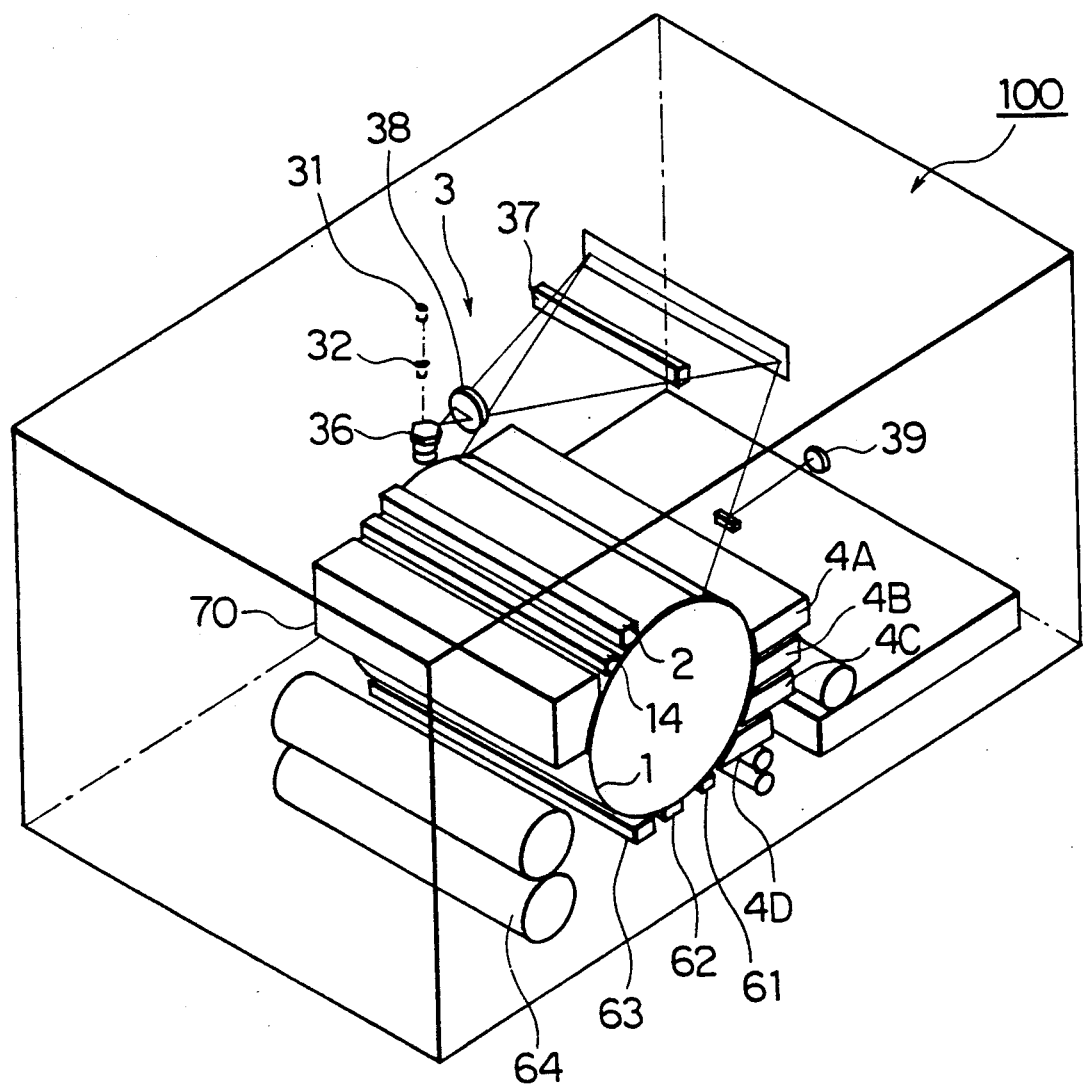
FIG. 1 is a perspective view showing the outline of the structure of an image forming apparatus of an embodiment to accomplish the first object of the present invention.
Figure 2A:
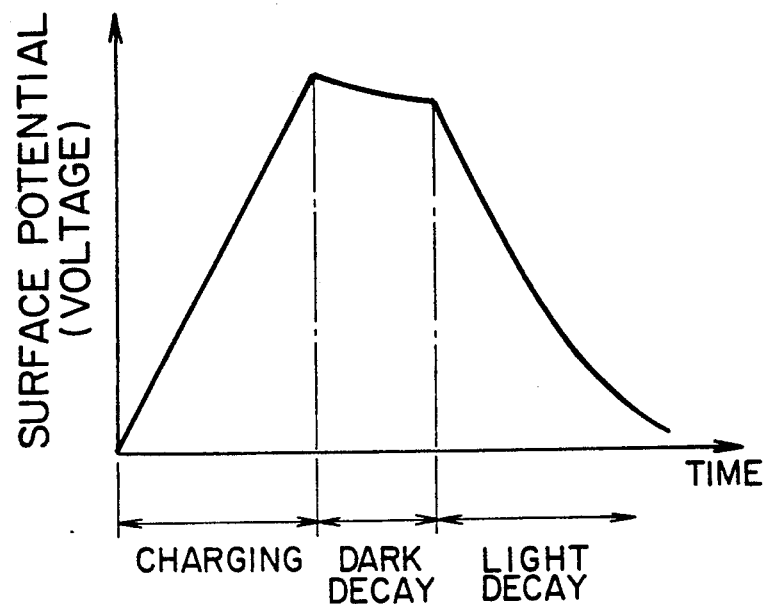
FIGS. 2a and 2b are characteristic diagram showing the characteristics of a low γ photoreceptor and a high γ photoreceptor.
Figure 2B:
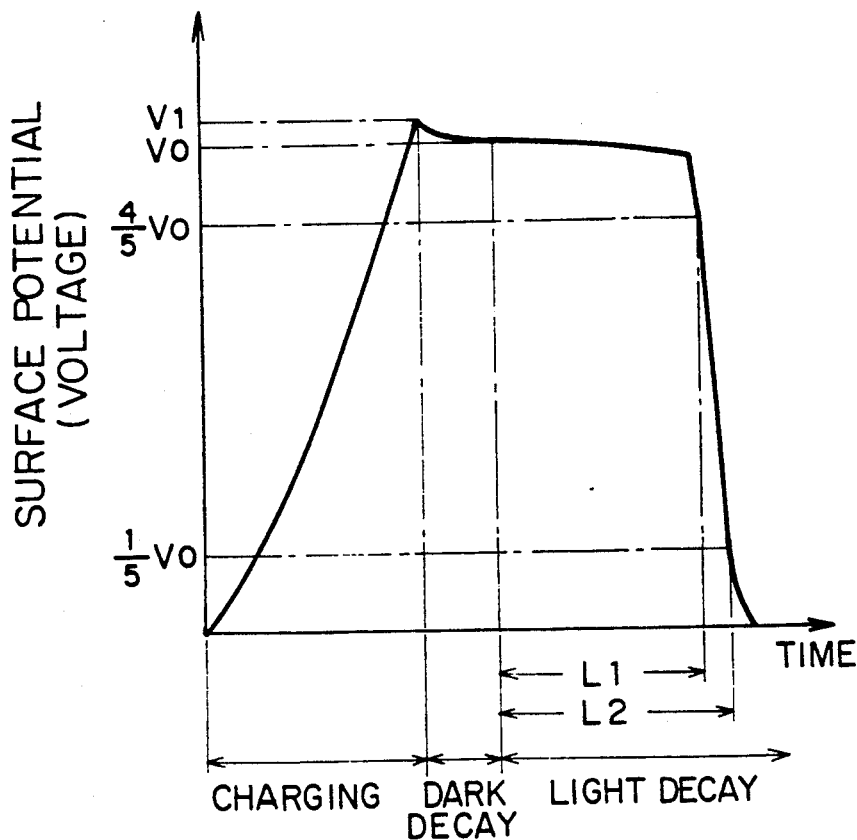

FIG. 1 is a perspective view showing the outline of the structure of the image forming apparatus of an embodiment of the present invention, FIG. 3 is a sectional view showing a specific structure of a high γ photoreceptor. FIG. 4 is a sectional view of a developing unit which is applied to the image forming apparatus of the embodiments.

After a photoreceptor has been uniformly charged in the image forming apparatus 100 of this embodiment, a shading correction, gray level correction and masking correction are conducted on an image density signal which has been A/D converted and sent from a computer or a scanner.

A color image is obtained as follows: a spot of light is used for exposure which is intensity-modulated or pulse-width-modulated according to a modulation signal that has been obtained by comparing an analog image density signal obtained by D/A-converting the aforementioned processed digital image density signal, with a reference wave signal; a dot-shaped electrostatic latent image is formed by the spot exposure; the electrostatic latent image is reversely developed by toner so that a dot-shaped toner image is formed; the aforementioned exposure and developing processes are repeated so that a color toner image can be formed on photoreceptor 1; and the aforementioned color toner images are transferred, separated and fixed so that final color image can be obtained.

The image forming apparatus 100 comprises: the drum-like photoreceptor 1 (which will be called a photoreceptor, hereinafter); a scorotron charger 2 which gives a uniform charge on the photoreceptor 1; an optical scanning system 3; developing units 4A, 4B, 4C, 4D in which toners of yellow, magenta, cyan and black are loaded; a pre-transfer charger 61; a scorotron transfer unit 62; a separator 63; a fixing roller 64; a cleaning unit 70; and a discharger 74.

The main structure of the embodiment will be explained as follows.

As shown in FIG. 3, the photoreceptor 1 comprises a conductive support 1A, a middle layer 1B and a photosensitive layer 1C. The thickness of the photosensitive layer 1C is 5–100 $\mu$, and preferably 10–100 $\mu$. The photosensitive layer 1C is composed in such a manner that: the drum-like conductive support 1A made from aluminum is utilized, the diameter of which is 150 mm; the intermediate layer 1B made from ethylene-vinyl acetate copolymer, the thickness of which is 0.1 $\mu$m, is formed on the aforementioned support 1A; and the photoconductive layer 1C, the layer thickness of which is 35 $\mu$m, is formed on the aforementioned intermediate layer 1B.

A drum made of aluminum, steel, copper or the like, the diameter of which is 150 mm, is used as the conductive support 1A. The following may be used as the conductive support IA: a belt-like support made of paper or plastic on which a metal layer is laminated or vapor-deposited; or a metallic belt such as a nickel belt made by the method of electroforming. The intermediate layer 1B is preferably provided with the following properties: the intermediate layer 1B can withstand a high potential of ±500–±2000 V, for example, in the case of positive charging, the migration of electrons from the conductive support 1C is prevented; and the intermediate layer 1B has a hole mobility so that an excellent light decay characteristic can be obtained due to an avalanche phenomenon. Therefore, a positive charging type of electric charge conveyance material, which is described in the specification of Japanese Patent Application Open to Public Inspection 44662/1988 proposed by the applicant, is preferably added into the intermediate layer IB by not more than 10 weight %.

For example, the following resins, which are applied to a photosensitive layer for use in electrophotography, may be used for the intermediate layer 1B.

(1) Vinyl polymer such as polyvinyl alcohol (poval), polyvinyl methylether, and polyvinyl ethylether (2) Nitrogen containing vinyl polymer such as polyvinyl amine, poly-N-vinyl imidazole, polyvinyl pyridine (polyvinyl pyridinium salt), polyvinyl pyrrolindone, and vinylpyrrolindone-vinyl acetate copolymer (3) Polyether polymer such as polyethylene oxide, polyethylene glycol, and polypropylene glycol (4) Acrylic acid polymer such as polyacrylic acid and its salt, polyacrylic amide, and poly-$\beta$-hydroxyethyl acrylate (5) Methacrylate polymer such as polymethacrylate and its salt, polymethacrylate amide, and polyhydroxypropyl methaacrylate (6) Ether cellulose polymer such as methyl cellulose, ethyl cellulose, carboxymethyl cellulose, hydroxyethyl cellulose, and hydroxypropyl methylcellulose (7) Polyethyleneimine polymer such as polyethyleneimine (8) Polyamino acid such as polyalanine, polyserine, poly-L-glutamic acid, poly(hydroxyethyl)-L-glutamine, poly-$\delta$-carboxymethyl-L-cystein, polyproline, lysine-tyrosine copolymer, glutamic acid-lysine-alanine copolymer, silkfibroin, and casein (9) Starch and its derivatives such as starchacetate, hydroxyne ethylstarch, starchacetate, hydroxyethylstarch, aminestarch, and phosphatestarch

(10) Polymer soluble in a mixed solvent of water and alcohol such as soluble nylon which is polyamide and methoxymethylnylon (8 type nylon)

The photosensitive layer 1C is formed in such a manner that: electric conveyance material is not essentially contained in the photosensitive layer 1C; phthalocyanine particulates, the diameter of which is 0.1–1 μm, composed of photoconductive pigment, an antioxidant, and a binder resin are mixed and dispersed in a solvent of binder resin, so that a coating slurry can be prepared; the aforementioned coating slurry is coated on the intermediate layer; the coated intermediate layer is dried; and heat treatment is conducted, if necessary.

When both of photoconductive material and electric charge conveyance material are contained, a photoconductive material including a photoconductive pigment and an electric charge conveyance material, the weight of which is not more than 1/5, preferably 1/100–1/10 of the aforementioned photoconductive pigment, and an antioxidant are dispersed in a binder resin so that a photosensitive layer is formed.

In this embodiment, color toner images are superimposed as registered each other on the photoreceptor, so that a photoreceptor, the spectral sensitivity of which is on the long wavelength side, is needed so that the infrared beam sent from the optical scanning system 3 can be accepted through the color toner images.

An electrostatic latent image is formed by the optical scanning system 3 in such a manner that a beam optically modulated according to an image density signal of a predetermined number of bits is projected on the circumferential surface of the photoreceptor 1 which has been uniformly charged.

As illustrated in FIG. 1, the optical scanning system 3 comprises: a semiconductor laser 31; collimator lens 32; a polygonal mirror 36; an f$\theta$ lens 38; a tilting correction lens 37 to correct the tilt caused by the polygonal mirror 36; and an index sensor 39.

The index sensor 39 is used as follows: the index sensor 39 detects the surface position of the polygonal mirror 36 which is rotated at a predetermined speed; and optical scanning is conducted according to the modulated image data, which will be described later, while the optical scanning is synchronized with the primary scanning.

GaAlAs is used for the semiconductor laser 31, and color images are superimposed as registered each other on the photoreceptor 1 in sequence. Accordingly, it is desirable to conduct exposure using light having a wavelength which is less absorbed by each color toner. In this case, the wavelength of the beam is 800 nm.

As illustrated in FIG. 4, the developing units 4A, 4B, 4C, 4D have the same structure, wherein the colors of developers to be loaded are different. The structure of developing device 40 is explained as follows.

The developing device 40 is provided with: a sleeve 43 including a magnetic roller 44 having N and S poles which is rotated inside a developing tank made of a lower casing 42 and an upper casing 41; a scraper 45 made of an elastic plate, which is mounted on a stationary member 46 fixed to an upper casing 41, and which comes into contact with a sleeve 43 with pressure; the first and second screw-shaped stirring members 47, 48; and a sleeve cleaning roller 49. The first stirring member 47 conveys the developer toward the viewer's side, and the second stirring member 48 conveys the developer to the far side with regard to the viewer. A wall 42 is installed between the stirring members 47, 48 so that the developer can not be accumulated in the tank. Instead of the scraper 45, a thin layer forming means composed of a magnetic plate or a magnetic rod may be installed.

The sleeve cleaning roller 49 is rotated in the direction of an arrow so that the developer which has passed through the developing region and in which the toner component has been consumed, can be scraped off from the sleeve 43. Therefore, the developer conveyed into the developing region can be replaced with a new one, so that the developing conditions are stabilized.

In order to prevent the occurrence of fogging, the sleeve 43 is connected with a development bias circuit 80 which impresses a voltage having a DC current bias component, through a protective resistance (not illustrated in the drawing).

In the case described above, a two-component type of developer D is used which is characterized in that: the particle size of the toner is 1–20 μm; and silica particulates processed by amine compounds or silica particulates to which other additives are added are used as the electric charge controlling agent. Small sized carrier particles are advantageous from the viewpoint of resolving power and gradation reproducibility. For example, when a small carrier, the particle size of which is 5-50 μm, is used, a uniform height of magnetic brush can be formed on the sleeve 43.

The development bias circuit 80 is provided with: an AC current power source which supplies an AC bias in order to oscillate the toner between the sleeve 43 and the photoreceptor 1 in the developing region wherein the toner conveyed by the sleeve is electrostatically transferred onto the photoreceptor and a high voltage DC current power source which supplies a DC current bias. In this example, $V_{DC}=800$ V, $V_{AC}=700$ V, and the frequency is 3 KHz. As described above, the development bias circuit 80 generates an oscillating electric field between the sleeve 43 and the photoreceptor 1, so that the particles of the developer are oscillated in the space between the sleeve 43 and the photoreceptor 1. Accordingly, a toner image can be formed on the photoreceptor 1 under the condition that developer D does not come into contact with the photoreceptor, so that the toner image formed previously is not damaged.

A one component type of developer can be also used as developer D in this embodiment. In the case of non-contact development in which one-component or two-component type of developer can be used, the developer does not come into contact with a latent image, so that it is difficult to develop a minute latent image. However, when a high γ type of photoreceptor is used so as to form a sharp latent image, development of minute portions can be improved.

For that reason, the effect of the present invention in which the high γ photoreceptor is utilized, can be increased not only in the case of contact development but also in the case of non-contact development.

Next, the composition of the developer used in the embodiment will be described as follows.

| [COMPOSITION OF THE DEVELOPER] | |
|---|---|
| Toner | |
| Polystyrene | 45 weight parts |
| Polymethyl methacrylate | 44 weight parts |
| Electrical charge controlling agent | 0.2-1.0 weight part |
| Coloring agent | 3-15 weight parts |

Materials having the above-described composition are mixed, kneaded and ground. Then, the materials are classified so that the toner, the averaged particle size of which is 3 μm (by weighing method), can be obtained. Silica particle was used as an outer additive of the toner. The electric charge of the toner is 20 μc/g.

In order to prevent the decrease in the amount of transmitted light due to light-absorption by toner, wherein light is sent from the writing system, the followings are used so that the coloring agent can have the spectral characteristics to prevent the above-described decrease.

Benzidine Yellow G (C.I.21090), Benzidine Yellow GR (C.I.21100), Permanent Yellow DHG (product of Hoechst Co.), Brilliant Carmine 6B (C.I.15850), Rhodamine 6G Lake (C.I.45160), Rhodamine B Lake (C.I.45170), Phthalocyanine Blue Non Crystal (C.I.74160), Phthalocyanine Green (C.I.74260), Carbon Black, Fat Yellow 5G, Fat Yellow 3G, Fat Red G, Fat Red HRR, Fat Red 5B, Fat Black HB, Zapon Fast Black RE, Zapon Fast Black B, Zapon Fast Blue HFL, Zapon Fast Red BB, Zapon Fast Red GE, Zapon Fast Yellow G, and Quinacridone Red (C.I.465000)

Carrier (Resin coated carrier)
Core : Ferrite
Coating resin : Styrene Acrylic copolymer (4:6)
Magnetization : 70 emu/g
Averaged particle size by weighing method: 30 μm (spherical)
Specific gravity : 5.2
Specific resistance : not less than $10^{13}$ Ω·cm The developer was prepared by mixing the above-described materials.

The structure and operation of the first drive circuit of the optical scanning system will be explained as follows.

Figure 5:
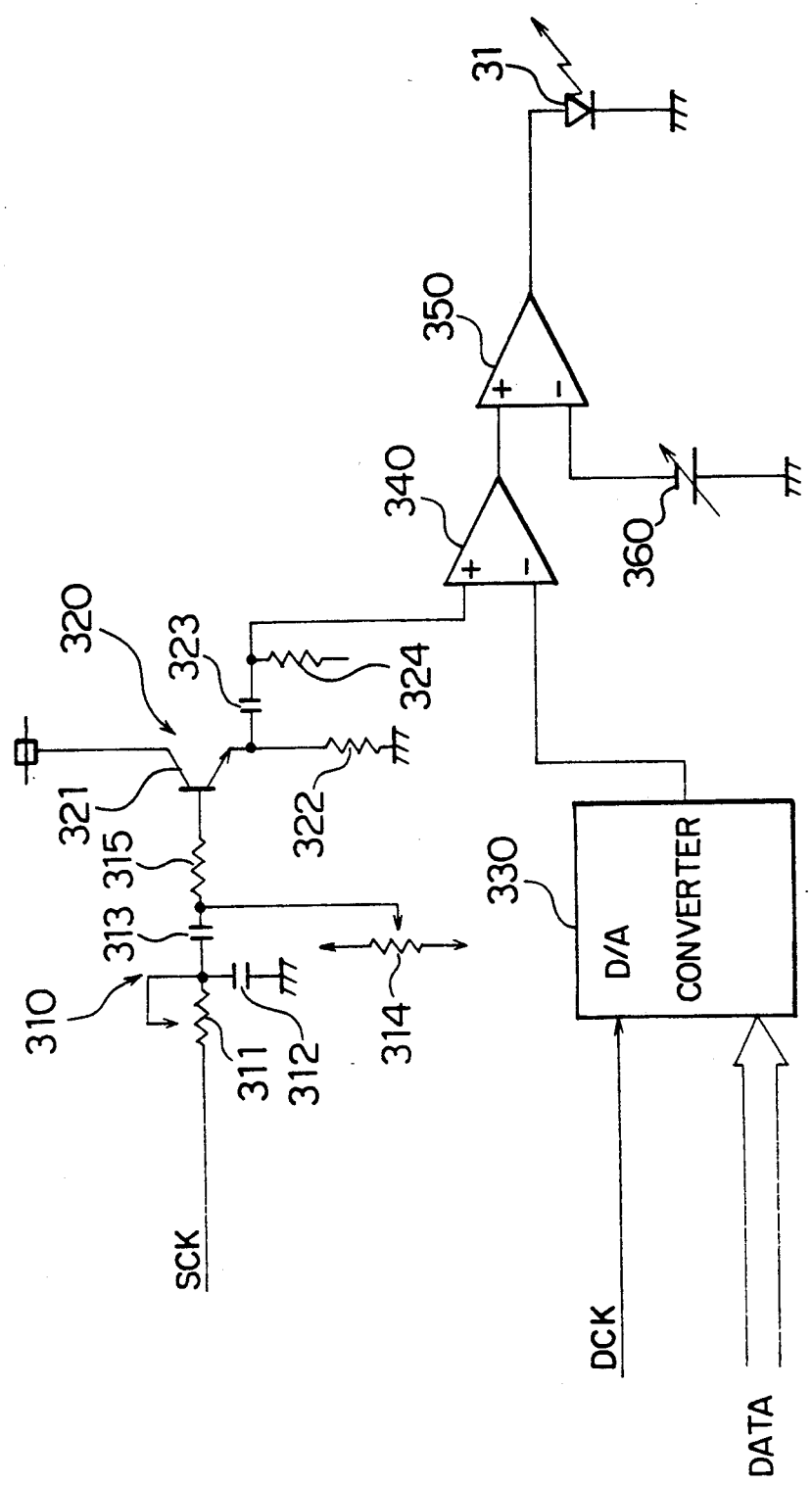
FIG. 5 is a block diagram showing the first drive circuit of the optical scanning system.
Figure 6A:
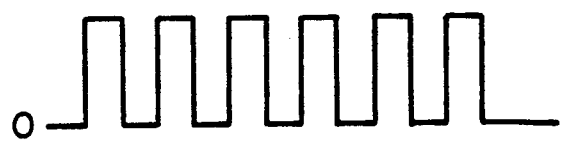
FIGS. 6a to 6d are time chart showing the wave-form of each portion of the first drive circuit.
Figure 6B:
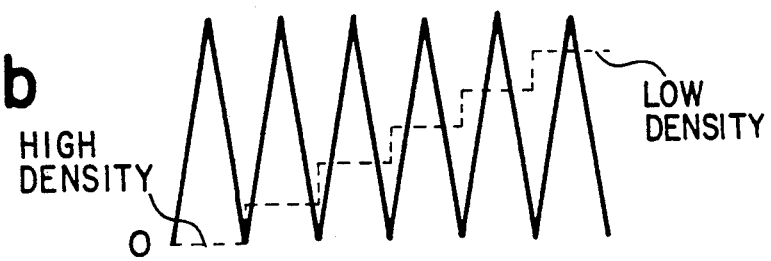
Figure 6C:
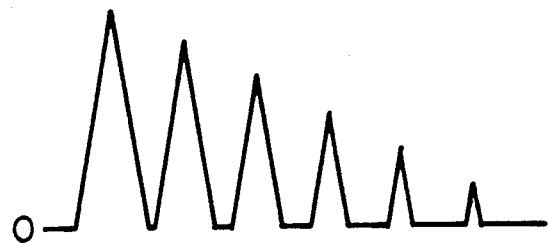
Figure 6D:

FIG. 5 is a block diagram showing the first drive circuit of the optical scanning system.

As illustrated in FIG. 5, a drive circuit 300 of an optical scanning system 3 forms an intensity-modulated signal according to an image density signal (image density data) sent from a computer or a scanner, and a semiconductor laser 31 is driven by the aforementioned modulation signal. The laser drive circuit 300 may be provided with a means to feed back a signal corresponding to the amount of light of the beam sent from the semiconductor laser 31, and the drive circuit 300 may be driven so that the amount of light can be constant.

As shown in FIG. 5, the drive circuit 300 comprises: a reference wave generating circuit 310; a buffer circuit 320; differential amplitude circuits 340, 350; a variable DC power source 360; and a D/A converter 330.

In the reference wave signal generating circuit 310, triangular waves are generated by an integrator which is composed of a variable resistor 311 and a condenser 312. The aforementioned triangular wave is inputted into a base terminal of a transistor 321 through a condenser 313 and a protective resistance 315. The reference wave signal generating circuit 310 is provided with two variable resistors. In other words, the variable resistor 311 is provided for adjusting the amplitude of the triangular wave. A variable resistor 314 is provided for adjusting the bias or the offset of the triangular wave.

The triangular wave is inputted into a positive input terminal of a differential amplifier 340 through the buffer circuit 320.

The differential amplifier 340 differentially amplifies a reference wave which has passed through the buffer circuit 320, and an analog density signal which has been obtained by D/A-converting of a digital image density signal of a predetermined number of bits, for example, 8 bits, by the D/A converter 330. Then, the obtained intensity modulation signal is outputted into the input terminal of the differential amplifier 350.

When an output signal sent from the variable DC current power source 360 is impressed upon the negative input terminal of the differential amplifier 350, the intensity modulation signal inputted into the positive terminal is level-shifted and outputted from the differential amplifier 350. This level-shifting corresponds to the white background in the image. In the manner described above, an intensity modulation signal synchronized with pixel-clock DCK is outputted from the differential amplifier 350. This signal is used as a drive signal to turn on and off the semiconductor laser 31.

FIG. 6 is a time chart showing the wave-form of each portion of the first drive circuit.

In the drawing, the numeral 6a is reference pulse SCK for a reference wave, and pulse SCK is synchronized with pixel clock DCK. The signal in 6b shown by a broken line is an analog density signal which has been D/A converted after color correction or gray level correction, and the signal shown by a solid line is a reference wave signal which is an output signal from the buffer 320. The numeral 6c is a modulation signal which has been intensity-modulated by the differential amplifier 340. The density signal corresponding to a recorded pixel and the reference signal are synchronized with each other, and an intensity modulation signal corresponding to the image density is generated. The numeral 6d is a signal obtained by level-shifting of the intensity-modulation signal. This level-shifting is conducted in accordance with the white background in the image as described above.

FIG. 7 is a schematic illustration which explains the relation between the intensity modulation signal which has been level-shifted from the drive circuit in the first embodiment, and the amount of light emitted from a semiconductor laser.

In the drawing, the graph shows an input and output characteristic showing the relation between the current inputted into the semiconductor laser 31 and the amount of emitted light. In the graph, A represents a region from which light is spontaneously emitted, and $\alpha$ represents a threshold value. When a current higher than the threshold value $\alpha$ is inputted, inductive emission occurs. In other words, it is a region in which inductive emission is conducted. The numeral 7a shows a current to be inputted into the semiconductor laser 31. As described above, a current which has been level-shifted in accordance with the white background in the image, is inputted into the semiconductor laser. In the way described above, the rising time of the semiconductor laser 31 can be improved. The numeral 7b shows the amount of light emitted from the semiconductor laser 31 in accordance with an inputted current. In the drawing, a one-dotted chain line shows the amount of light needed to half-decay-exposure in the high $\gamma$ photoreceptor used in this embodiment. In other words, since the photoreceptor is a high $\gamma$ type, a latent image is not formed when the amount of exposure sent from the semiconductor laser 31 is lower than the amount of half decay exposure, in other words, when the amount of exposure sent from the semiconductor laser 31 is lower than the amount which is necessary to change potential $V_0$ to $\frac{1}{2}V_0$. Therefore, even when the level-shifted DC current is higher than the threshold value current $\alpha$, it can correspond to the white background. In other words, in this embodiment, the semiconductor laser is oscillated even in the portion corresponding to the white background. The numeral 7c shows an exposure dot distribution which is recorded on the photoreceptor 1. In this exposure dot distribution, the position of the amount of light to cause the half-decay-exposure is indicated by a broken line. In the portion where the amount of light is larger than the aforementioned position, a latent image is formed by the photosensitive characteristic of the high $\gamma$ photoreceptor. In other words, a latent image composed of various sizes of dots can be obtained according to the density signal, and is shown in the image density distribution of dots obtained by developing the aforementioned latent image. Sharper and smaller dot-shaped latent images can be formed. Actually, the distribution of exposure of a dot extends wider than the blur portion of the optical scanning system 3. Consequently, there is a tendency that the diameter of a recorded dot in a high density portion is large, and the diameter of a recorded dot in a low density portion is small.

The image forming process by the image forming apparatus 100 of the embodiment will be explained as follows.

After the photoreceptor 1 has been charged by a scorotron charger 2, image exposure is conducted by the beams sent from an optical scanning system 3 so that an electrostatic latent image corresponding to each color is formed on the drum-like photoreceptor 1. The electrostatic latent image corresponding to yellow is formed by irradiating the photoreceptor 1 with a laser beam which has been optically modulated by yellow data (digital density data). The aforementioned electrostatic latent image corresponding to yellow is developed by the first developing unit 4A, and the first dot-like toner image (a yellow toner image), which is very sharp, is formed on the photoreceptor 1. This first toner image is not transferred onto recording paper. The surface potential of the first toner image is discharged by an AC current corona discharge conducted by a discharger, then the first toner image is optically discharged by infrared rays 14. Next, the photoreceptor 1 is charged again by the scorotron charger 2.

Next, the laser beams are optically modulated by magenta data (digital density data), and the photoreceptor 1 is illuminated by the modulated laser beams so that an electrostatic latent image can be formed. This electrostatic latent image is developed by the second developing unit 4b and the second toner image (a magenta toner image) is formed. In the same manner described before, discharging, charging and exposing by laser beams are conducted, then the toner images are developed by the third developing unit 4C in order that the third toner image (a cyan toner image) is formed. In this way, a three-color toner image in which toner images are superimposed, is formed on the photoreceptor 1. Finally, the fourth toner image (a black toner image) is formed so that a four-color toner image is formed on the photoreceptor 1.

According to the image forming apparatus 100 of the present invention, the photoreceptor has an excellent high $\gamma$ characteristic. Due to the high $\gamma$ characteristic, a latent image can be stably formed when the processes of charging and exposure are repeated a plurality of times so that toner images can be superimposed. In other words, even when a toner image is exposed by a laser beam according to a digital signal, a sharp dot-shaped electrostatic latent image in which a fringe is eliminated, can be formed. As a result, a highly sharp toner image can be obtained.

After the photoreceptor 1 has been charged by the charger 61 (this process may be omitted), this four-color toner image is transferred by a transfer unit 62 onto recording paper.

Recording paper which conveys a transferred toner image, is separated from the photoreceptor 1 by a separation electric pole 63, conveyed by a guide and a conveyance belt into a fixing unit 64, fixed by the method of heat fixing, and discharged onto a delivery tray.

The photoreceptor 1 which has finished transferring of the toner image is prepared for the next multi-color image forming in such a manner that: the residual toner on the surface is removed by a blade, a fur brush or a magnetic brush of a cleaning unit 70 which has been released during toner image forming; and the photoreceptor is discharged by a discharger 74 composed of a corona discharger and a lamp. The lamp and the corona discharger 74 may be provided upstream of the cleaning means. The discharging process for each toner image forming may be omitted when the DC component in the current inputted into the semiconductor laser 31 is not more than the threshold current $\alpha$.

Other wave-forms may be used as a reference wave. A sharp image having a high gradation was obtained when the following reference wave was selected: the reference wave was composed of large and small triangular waves, the period of which was twice as long as that of the recording pixel. A sharp image having a high resolution was obtained when the same triangular wave was used (the period of which was twice as long as that of the recording pixel). Generally speaking, image reproduction by a high $\gamma$ photoreceptor tends to become high contrast, so that it is effective for the reference wave to have a plurality of peaks in one period as described above in order to improve the gradation property. A sharp image having a high resolution was obtained when a reference wave composed of the same triangular wave was adopted (one period of which becomes the same as that of the recording pixel).

A reference wave, the period of which is longer than that of a recording pixel, may be adopted. For example, when a reference wave is adopted, the period of which is 4 times as long as that of a recording pixel, a desirable result can be obtained.

In this embodiment, intensity modulation in which the semiconductor laser 31 is utilized, has been explained. However, the present invention is not limited to this specific embodiment. When an LED array, an LCS array, or other light emitting element is used, optical modulation can be conducted by a density signal which has been intensity-modulated in the same manner, so that the same effect can be provided.

Figure 8:
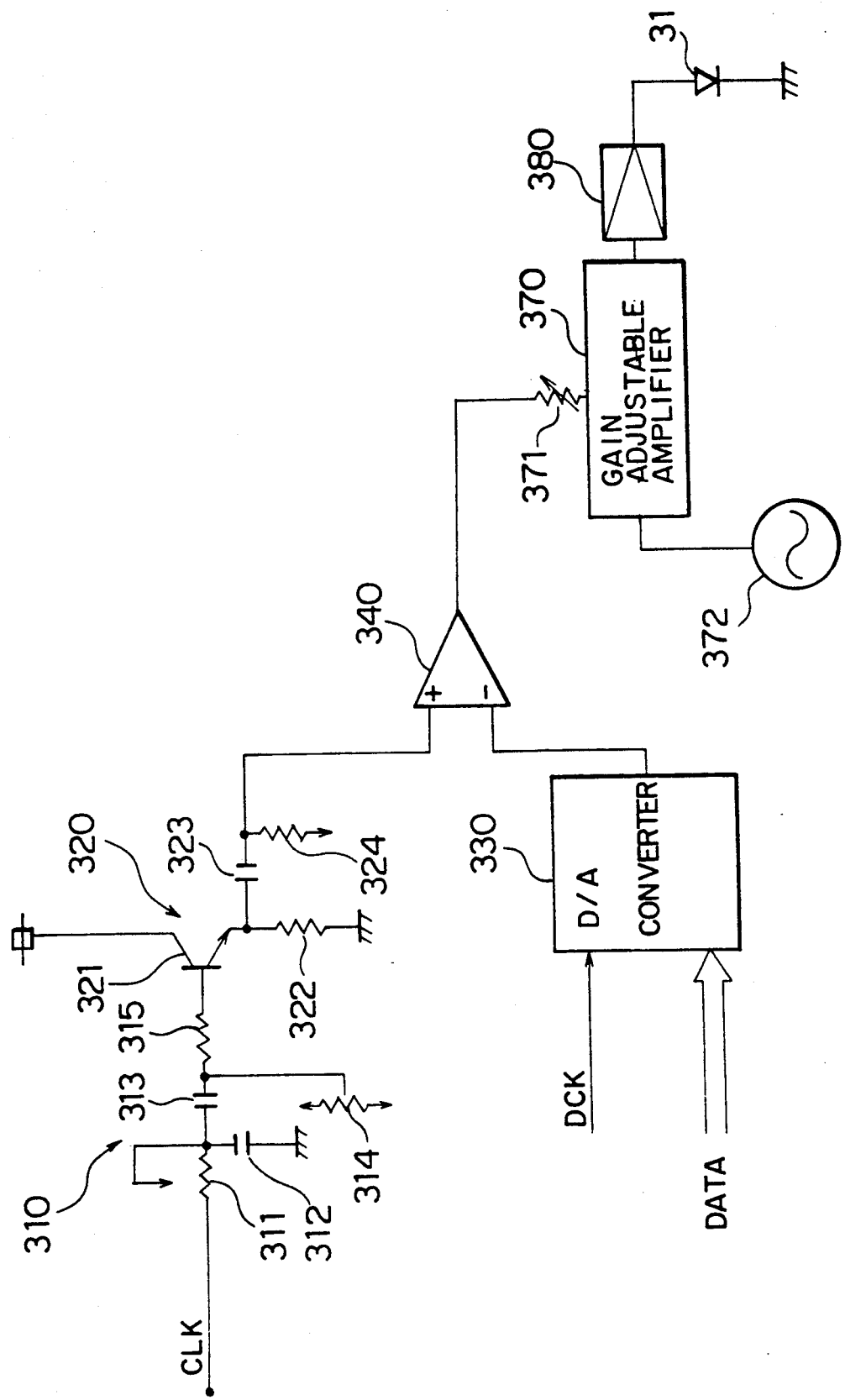
FIG. 8 is a block diagram showing a drive circuit of the second embodiment of an optical scanning system 3.
Figure 9A:
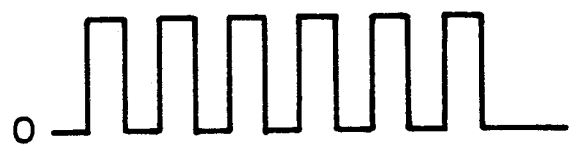
FIGS. 9(a) to 9(d) are time charts showing the wave-forms of portions in the drive circuit of the embodiment.
Figure 9B:
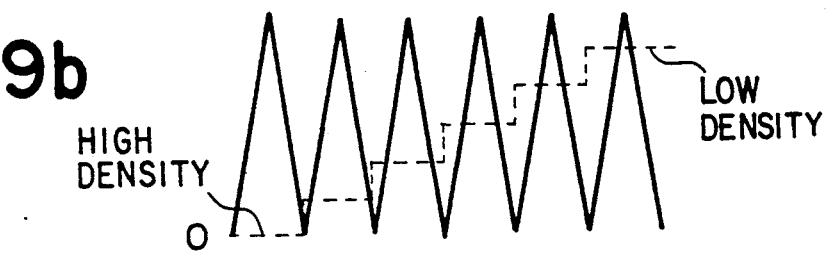
Figure 9C:
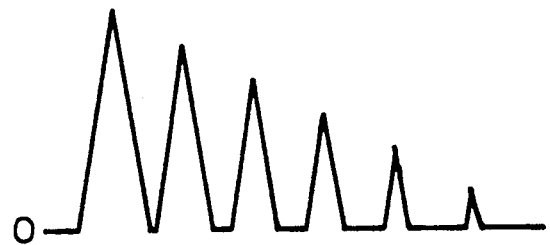
Figure 9D:
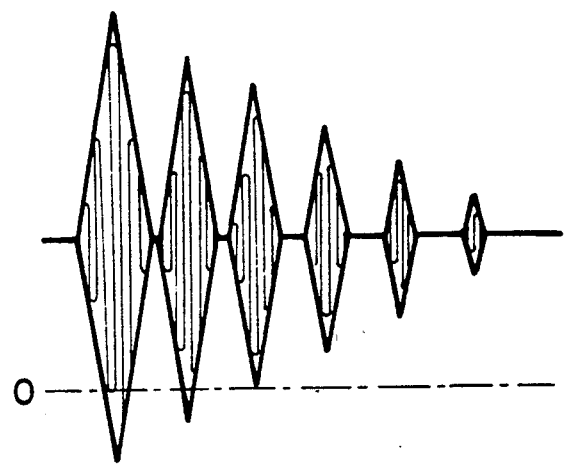

FIG. 8 is a block diagram showing a drive circuit of the optical scanning system 3 of the second embodiment.

A drive circuit functions as follows: an analog image density signal is intensity-modulated by a reference signal; a conveyance wave signal is modulated by the intensity-modulation signal; and the aforementioned signal is level-shifted, and the obtained modulation signal is impressed upon the semiconductor laser 31. The drive circuit is composed of, a reference wave signal generating circuit 310, a buffer circuit 320, a differential amplifier 340, a D/A converter 330, a variable resistor 371, a variable gain amplifier 370, a high band power amplifier 380, and a conveyance wave signal generating circuit 372.

In the reference wave generating circuit 310, a triangular wave is generated by an integrator composed of a variable resistor 311 and a condenser 312. Further, the triangular wave is inputted into a base terminal of a transistor 321 through a condenser 313 and a protective resistor 315. The reference wave generating circuit 310 is provided with two variable resistors. The variable resistor 311 is provided for adjusting the amplitude of the triangular wave. A variable resistor 314 is provided for adjusting the bias and offset of the triangular wave.

The triangular wave (which is shown by a solid line in 9b in FIG. 9) is outputted into the pisitive input terminal of the differential amplifying circuit 340 through the buffer circuit 320.

On the other hand, an analog image density signal obtained when a digital image density signal composed of 8-bit is D/A-converted by the D/A converter 330, is outputted into the negative input terminal of the aforementioned differential amplifier 340. Then, the differential amplifier 340 intensity-modulates the analog image density signal with the reference signal, and inputs the modulation signal into the variable gain amplifier 370 through the variable resistor element 371. According to this signal, a conveyance wave, the frequency of which is not less than 600 MHz, is amplitude-modulated by the variable gain amplifier 370, and a high frequency voltage obtained by amplifying the signal with the high band power amplifier 380 is impressed upon the electric terminal of the semiconductor laser 31. The high band amplifier 380 is also provided with the function of level-shifting the modulation signal using a DC component.

The numerals 9a–9d in FIG. 9 are time charts showing the wave-form of each portion in the drive circuit of this embodiment.

In the drawing, the numeral 9a is a reference pulse SCK for a reference wave, and pulse SCK is synchronized with pixel clock DCK. The signal indicated by a broken line in 9b is an analog density signal which has been D/A-converted after color correction and gradation correction, and the signal indicated by a solid line is a reference signal which is an output signal from the buffer 320. The numeral 9c is an intensity-modulation signal which has been intensity-modulated by the differential amplifier 340. The density signal corresponding to a recording pixel is synchronized with the reference signal so that an intensity-modulation signal corresponding to the image density can be generated. The numeral 9d shows a modulation signal which is obtained by amplitude-modulating of a conveyance wave signal with the intensity-modulation signal. In this case, it is further shown that the modulation signal is further level-shifted with the high band power amplifier.

FIG. 10 is a schematic illustration which explains the relation of the amount of light emitted from the semiconductor laser according to the intensity-modulation signal which has been level-shifted from the drive circuit of the second embodiment.

In the drawing, A is a region from which light is emitted spontaneously, and $\alpha$ is a threshold current value. When a current higher than the threshold current value $\alpha$ is inputted, light is emitted in the manner of inductive emission. In other words, it is a region from which light is emitted inductively. The numeral 10a shows a current which is inputted into the semiconductor laser 31. As described before, the current which has been level-shifted by the amount corresponding to the white background of the image, is inputted into the semiconductor laser. For that reason, the rising time of the semiconductor laser 31 can be improved. The numeral 10b shows the amount of light emitted from the semiconductor laser 31 corresponding to the current. In the drawing, a one-dotted chain line shows the amount of light to the half decay exposure in the high $\gamma$ photoreceptor utilized in this embodiment. Namely, the photoreceptor is a high $\gamma$ type. Accordingly, in the case where the amount of exposure given by the semiconductor laser 31 is equal to the amount of light necessary for the half decay exposure voltage $\frac{1}{2}V_0$, a latent image is not formed. Therefore, even when the DC component which has been level-shifted, is more than the threshold value $\alpha$, the current corresponds to the white background. Namely, in this embodiment, the semiconductor laser 31 is oscillated even in a portion corresponding to the white background. The numeral 10c shows an exposure distribution which is recorded on the photoreceptor 1. In this exposure dot distribution, the portion beyond the light amount to the half decay exposure is indicated by a broken line, and the portion above the broken line is formed as a latent image due to the characteristic of a high γ type of photoreceptor. Namely, a latent image can be obtained which is composed of large and small sizes of dots according to the density signal, and the distribution shows a dot-like image density distribution formed by developing the aforementioned latent image. Further, a sharper and smaller dot-like latent image can be formed.

Actually, the diameter of the exposed dot is extended due to the blur of the optical scanning system, so that there is a tendency that the diameter of the recorded dot becomes large in a high density portion, and the diameter of the recorded dot becomes small in a low density portion.

Next, the third embodiment is shown as follows.

Figure 11:
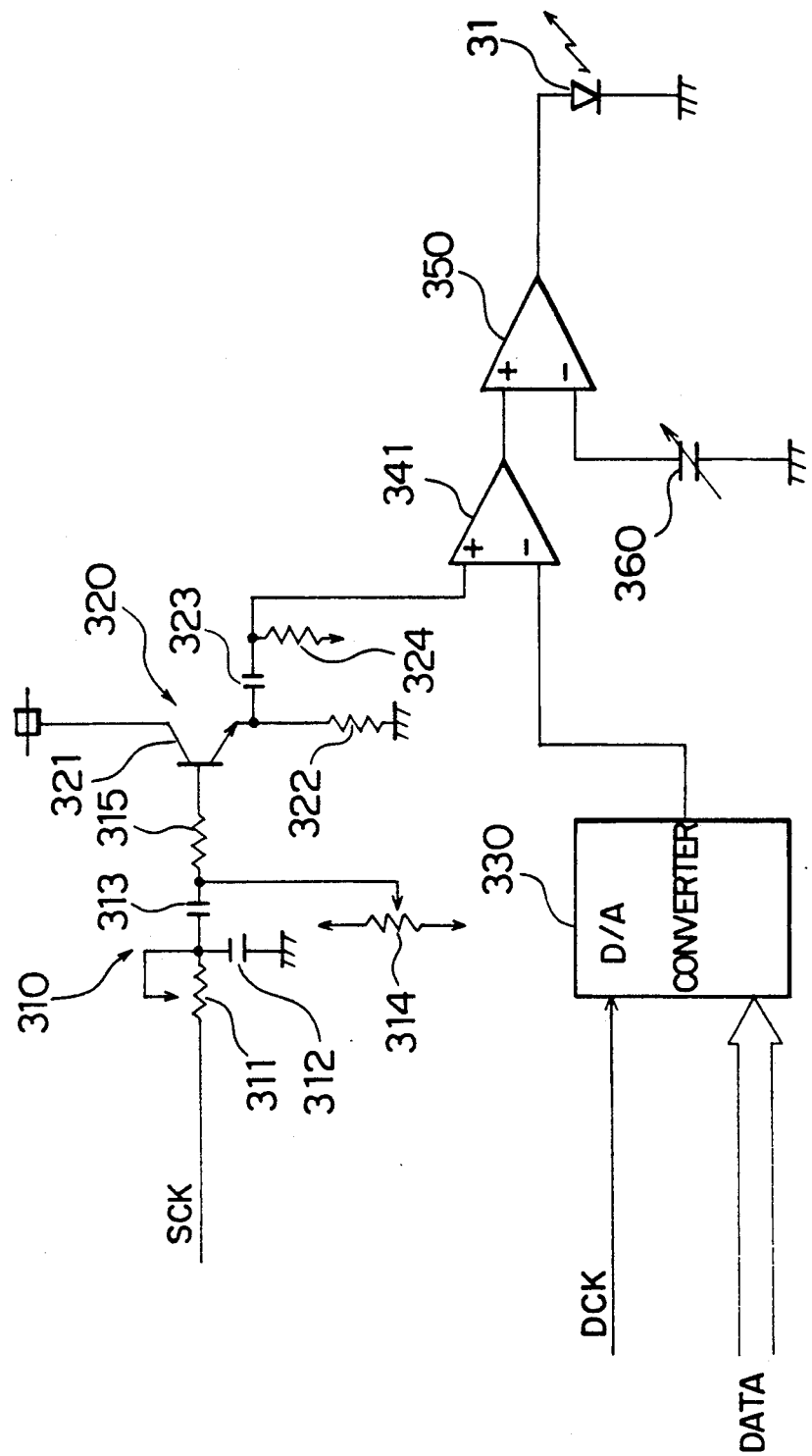
FIG. 11 is a block diagram showing the third drive circuit of the optical scanning system.
Figure 12A:
FIGS. 12a to 12d are time chart showing the wave-forms of portions of the third drive circuit.
Figure 12B:
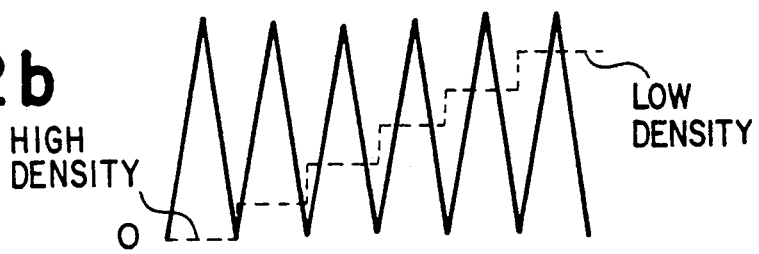
Figure 12C:
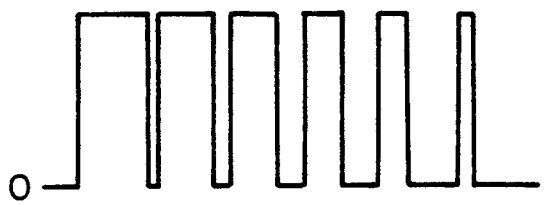
Figure 12D:
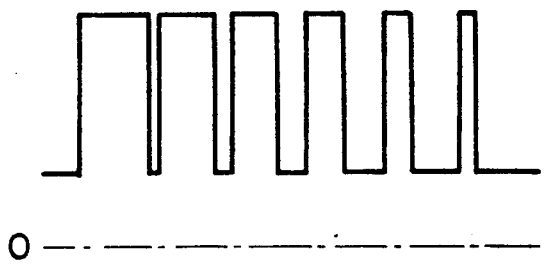

As shown in FIG. 11, the drive circuit comprises the reference wave signal generating circuit 310, the buffer circuit 320, the differential amplifying circuit 350, the variable DC current power source 360, and the D/A converter 330.

In the reference wave generating circuit 310, a triangular wave is generated by an integrator composed of a variable resistor 311 and a condenser 312. Further, the triangular wave is inputted into a base terminal of a transistor 321 through a condenser 313 and a protective resistor 315. The reference wave generating circuit 310 is provided with two variable resistors. The variable resistor 311 is provided for adjusting the amplitude of the triangular wave. A variable resistor 314 is provided for adjusting the bias and offset of the triangular wave.

The triangular wave is inputted into the positive input terminal of a comparator 341 through the buffer circuit 320.

In the comparator 341, a comparison is made between the reference wave which has passed through the buffer circuit 320 as described above, and the analog density signal which has been obtained by D/A-converting of the digital image density signal of a predetermined number of bits, for example 8 bits, through the D/A converter 330. The pulse width modulation signal obtained in the aforementioned manner is, outputted into the input terminal of the differential amplifier 350.

When the output signal sent from the variable DC current power source 360 is impressed upon the negative input terminal of the differential amplifier 350, the differential amplifier 350 outputs the intensity-modulation signal which has been level-shifted after being inputted into the positive terminal, wherein the intensity-modulation signal is the DC component. The amount which has been level-shifted, corresponds to the white background. In the way described above, the differential amplifier 350 outputs a pulse width signal having a DC component synchronized with pixel clock DCK. This signal is used as a drive signal which turns on and off the semiconductor laser 31.

FIG. 12 is a time chart showing the wave-form of each portion in the third drive circuit.

In the drawing, the numeral 12a is reference pulse SCK, and the pulse SCK is synchronized with pixel clock DCK. A signal shown by a broken line in 12b is an analog density signal which has been D/A-converted after color correction or gradation correction. A signal shown by a solid line is a reference signal which is an output signal sent from the buffer 320. The numeral 12c is a modulation signal which has been pulse-width-modulated by the comparator 341. The density signal corresponding to a recorded pixel and the reference signal are synchronized, and a pulse-width-modulation signal is generated corresponding to the image density. The numeral 12d is a signal obtained by level-shifting of the pulse-width-modulation signal. The amount of level-shifting corresponds to the white background of the image as described above.

Figure 13:
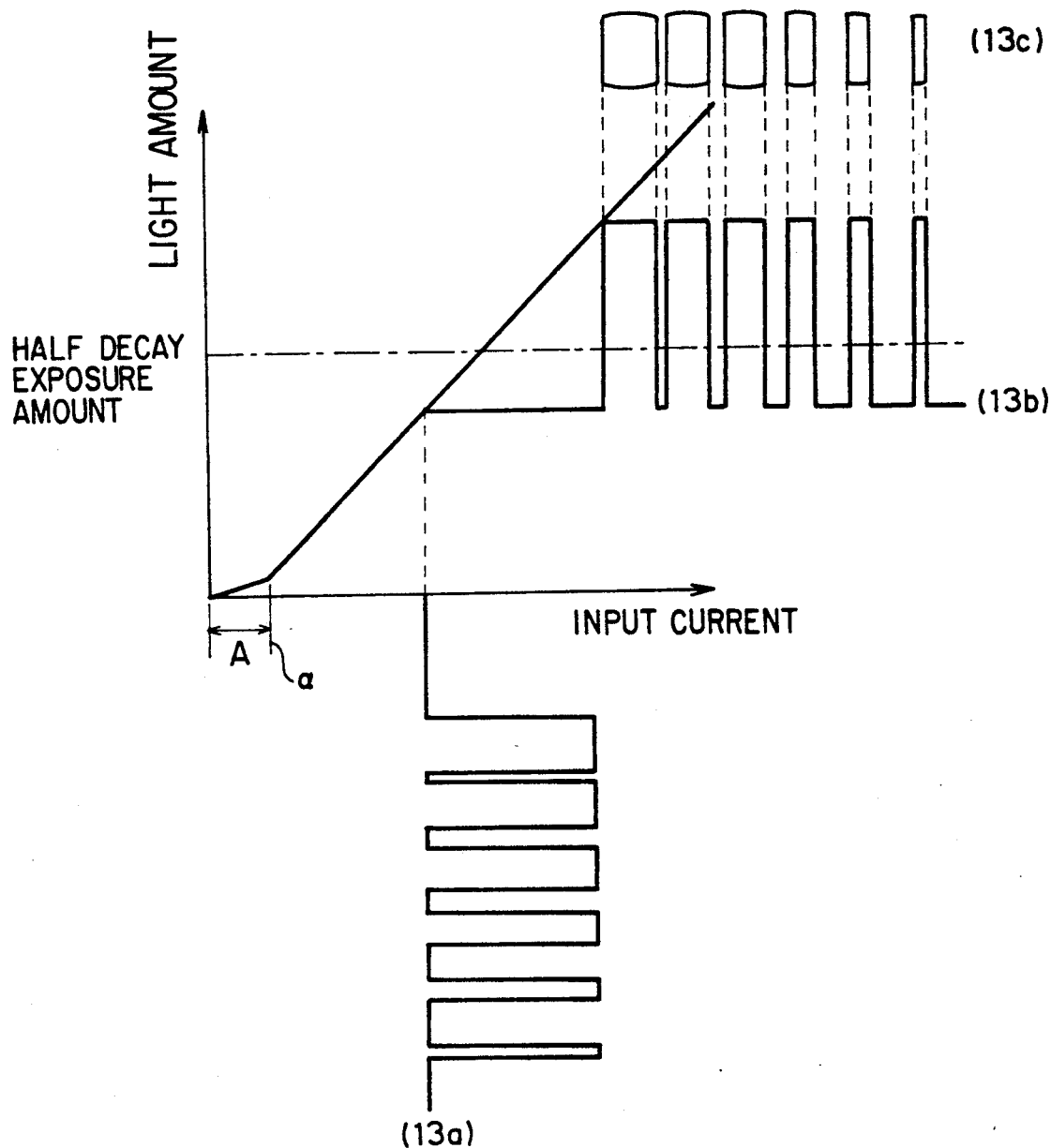
FIG. 13 is a schematic illustration which explains the relation of the amount of light emitted from a semiconductor laser according to the pulse-width modulation signal which has been level-shifted from the drive circuit of the third embodiment.
Figure 14A:
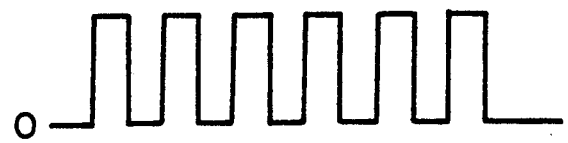
Figure 14B:
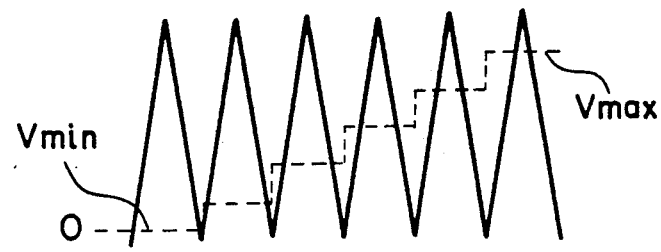
Figure 14C:
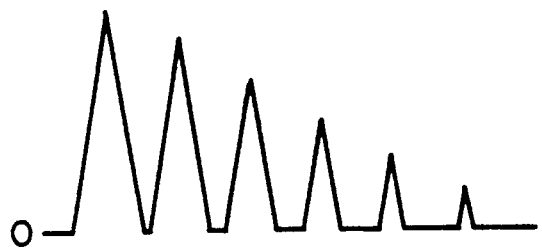
Figure 14D:

FIG. 13 is a schematic illustration which explains the relation between a pulse-width-modulation signal which has been level-shifted from the drive circuit of the third embodiment, and the amount of light emitted from the semiconductor laser.

In the drawing, the graph represents the input and output characteristic which shows the relation between the input current into the semiconductor laser 31 and the amount of emitted light. In the drawing, A is a region from which light is emitted spontaneously, and α is a threshold current value. When a current higher than the threshold current value α is inputted, light is emitted in the manner of inductive emission. In other words, it is a region from which light is emitted inductively. The numeral 13a shows a current which is inputted into the semiconductor laser 31. As described before, the current which has been level-shifted by the amount corresponding to the white background of the image is inputted into the semiconductor laser. In the way described above, the rising time of the semiconductor 31 can be improved. The numeral 13b shows the amount of light emitted from the semiconductor 31 corresponding to the inputted current. In the drawing, a one-dotted chain line shows the light amount to the half decay exposure in the high γ photoreceptor utilized in the embodiment. Namely, the photoreceptor is a high γ type. Accordingly, in the case where the amount of exposure given by the semiconductor laser 31 is equal to the amount of light necessary for the half decay exposure voltage $\frac{1}{2}V_0$, a latent image is not formed. Therefore, even when the DC component which has been level-shifted, is more than the threshold value α, the current corresponds to the white background. Namely, in this embodiment, the semiconductor laser 31 is oscillated even in a portion corresponding to the white background. The numeral 13c shows the distribution of exposure dots which are recorded on the photoreceptor 1. The portion equivalent to the half decay exposure is shown by a broken line in the exposure distribution. The portion beyond the aforementioned portion is formed into a latent image due to the high γ photoreceptor characteristic. Namely, a latent image can be obtained which is composed of large and small sizes of dots according to the density signal, and the distribution shows a dot-like image density distribution formed by developing the aforementioned latent image. Accordingly, a sharper and smaller dot-like latent image can be formed.

Although the shape of the exposure dot distribution is oval, the distribution of the exposure dot is extended due to the blur of the optical scanning system 3, so that there is a tendency that the diameter of the recorded dot becomes large in a high density portion, and the diameter of the recorded dot becomes small in a low density portion.

In the embodiment, the print density can be changed according to the print content. Namely, when the DC component of the reference wave is shifted, the density can be changed. In the embodiment, the DC component is larger than the threshold current α. However, it is possible to set the DC component to a smaller value than the threshold current α.

In this embodiment, noises become stable with regard to the change of temperature and light feed back and further spike-like noises are not caused.

Next, an embodiment will be explained as follows in which the maximum and minimum of the image density signal are set inside the reference signal.

In the same manner as described in FIG. 6, the signal shown by a broken line in 14b illustrated in FIG. 14, is an analog density signal which has been D/A-converted after a color correction and gradation correction according to the recording characteristic. The signal shown by the broken line is a reference signal which is the output signal sent from the buffer 320 in FIG. 5. In the drawing, Vmin corresponds to the minimum (the black background) of the image density signal, and Vmax corresponds to the maximum (the white background) of the image density signal. Since the amplitude of the reference wave exceeds Vmax of the image density signal, exposure is conducted in the white background. A portion of the reference wave amplitude is located below Vmin of the image density signal, so that exposure is partially conducted in the black background. Accordingly, dots can be positively formed in the low density portion, and dots of a small diameter can be formed in the high density portion. In the manner explained above, the recording characteristic of the high γ photoreceptor can be improved.

In this case, the amount of exposure at Vmax corresponding to the white background may be set to a value approximately the same as or smaller than the light amount $P_{\frac{1}{2}}$ to the half decay exposure by setting the amplitude of the reference wave signal to a large value instead of the DC component.

| Ratio | 1.0 | 1.1 | 1.2 | 1.3 | 1.4 | 1.5 | 1.6 | 1.7 | 1.8 | 1.9 | 2.0 |
|-------|-----|-----|-----|-----|-----|-----|-----|-----|-----|-----|-----|
| Image | ' | ✕ | ... | ... | ... | ... | ✕ | ' | ' | ' | ' |

In the above table, "Ratio" shows a ratio of the level width (Vmax−Vmin)/2 of the image density signal to the amplitude of the reference wave signal. Mark . . . shows that the image quality is good, mark ✕ shows that the image quality is a little inferior, and mark ' shows that the image quality is bad.

Namely, the level of amplitude is preferably 1.1–1.5 times that of the level width (Vmax−Vmin) of the image density signal. When the amplitude level is smaller than the level width of the image density signal, the gradation reproduction becomes incomplete in the low and high density regions, so that the image becomes highly contrasted.

When the amplitude level becomes more than 1.5 times, fogging occurs in the low density portion, and density is lowered in the high density portion.

The aforementioned embodiment can be applied not only to the drive circuit shown in FIG. 5 but also to other drive circuits.

Next, an embodiment will be explained in which the reference wave signal is variable.

FIG. 15 shows the wave-form of each portion in the case when this embodiment is applied to the drive circuit in FIG. 5. In the drawing, a solid line shows a case in which an image of high contrast is reproduced, and a broken line shows a case in which an image of low contrast is reproduced. When the amplitude is made large, the diameter of the recording dot becomes small in the high density portion, and dots are positively formed in the low density portion. In order to reproduce a desirable image, it is necessary to make the amplitude small in the case of a character or line image, and it is necessary to make the amplitude large in the case of a multi-level image. The density signal corresponding to a recording pixel is synchronized with the reference signal, and an intensity-modulation signal corresponding to the image density is generated.

Figure 16:
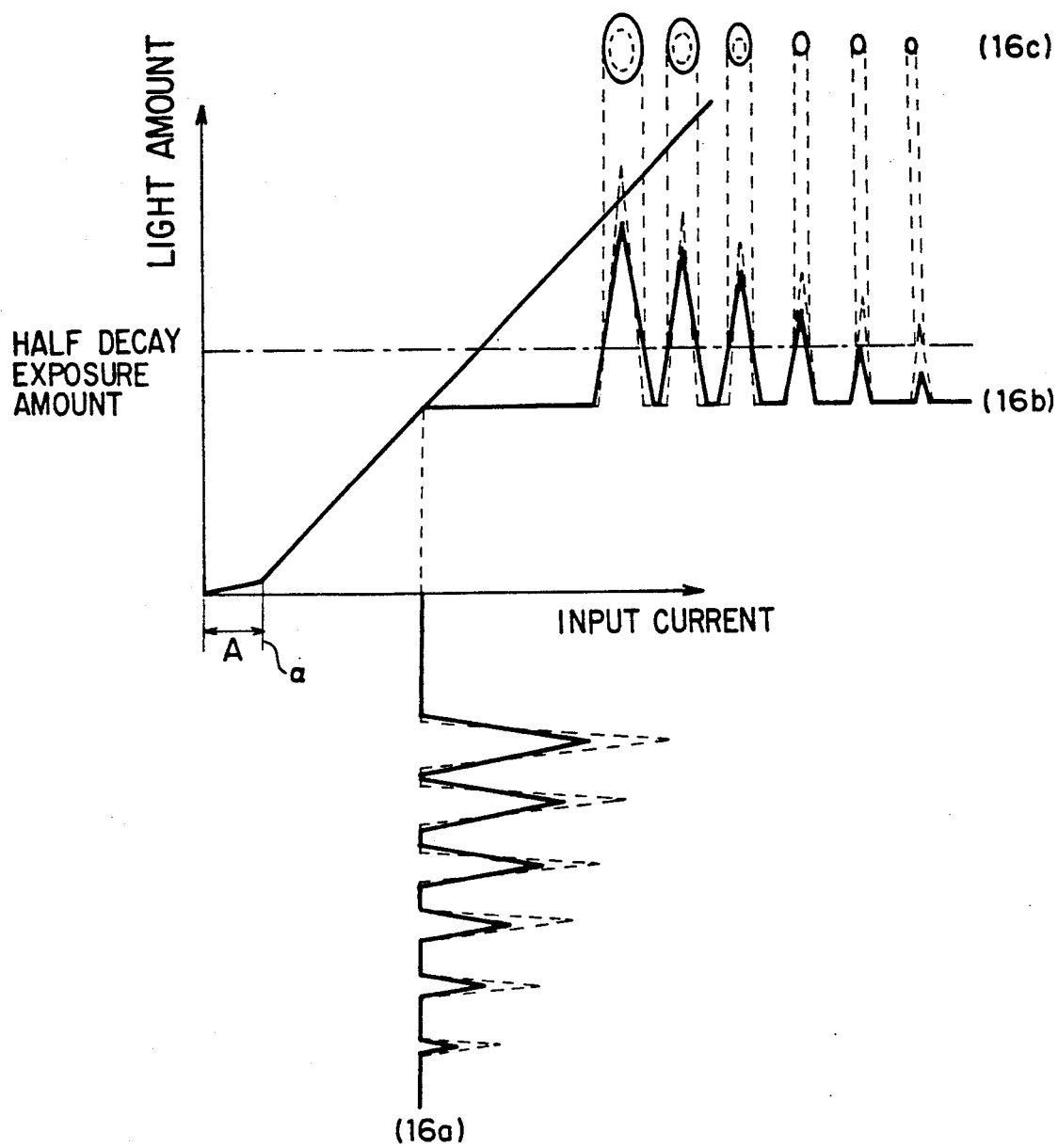

When the amplitude is made variable, which is illustrated by FIG. 16 in which the relation between the amplitude of the reference wave and the dot diameter is shown, the case of small amplitude is shown by a solid line and the case of large amplitude is shown by a broken line. Namely, the recording dot diameter becomes small in the more exposed portion (which corresponds to the high density portion), and the recording dot diameter becomes large in the less exposed portion (which corresponds to the low density portion). As described above, in the case in which the amplitude is large, an image of high gradation can be reproduced.

In the same way as the drive circuit illustrated in FIG. 5, this embodiment can be applied to other drive circuits.

The present invention is to provide an image forming apparatus which is characterized in that: an image is formed on a photoreceptor having a light decay characteristic by which the photoreceptor potential is not decayed in the initial period of exposure and sharply decayed in the middle period of exposure, by oscillating a semiconductor laser beam in accordance with a modulation signal obtained by modulating an image density signal with a reference wave signal, wherein a direct current component is included in a modulation signal corresponding to the white background of the aforementioned image density signal. Accordingly, the following effects can be provided to the image forming apparatus of the invention: the response to a drive signal is improved; the variation of beam intensity caused by environmental factors such as heat is decreased; and a latent image can be stably formed.

When the exposure intensity corresponding to the white background is made almost the same as or smaller than the light amount to the half decay exposure in which the charging potential becomes $\frac{1}{2}$, a sharp and small latent image can be provided.

When a modulation signal having a DC component is utilized which has been made from the aforementioned image density signal by the reference wave, noises become stable with regard to the change of temperature and the light feed back, and further a spike-like noise is not caused, so that the image forming apparatus can form a latent image stably.

Furthermore, when a modulation signal is utilized which is obtained by amplitude-modulating the high frequency signal using the modulation signal which has been obtained by modulating the image density signal by the aforementioned reference signal, noises become stable with regard to the change of temperature and the light feed back, and further a spike-like noise is not caused, so that the image forming apparatus can form a latent image stably.

When the image density signal is pulse-modulated by the reference signal, an image forming apparatus can be provided which can form a sharp and small latent image.

According to a preferable embodiment of the present invention, the image forming apparatus forms an image on a photoreceptor having a light decay characteristic by which the photoreceptor potential is not decayed in the initial period of exposure and is sharply decayed in the middle period of exposure, using a modulation signal which has been obtained by modulating the image density signal by the reference signal. When the maximum and minimum of the aforementioned image density signal are set inside the aforementioned reference signal, the gradation property of the image recording characteristic can be improved, and a latent image can be stably formed.

Furthermore, according to a preferable embodiment of the present invention, the image forming apparatus forms an image on a photoreceptor having a light decay characteristic by which the photoreceptor potential is not decayed in the initial period of exposure and is sharply decayed in the middle period of exposure, using a modulation signal obtained by modulating the image density signal with the reference signal. When the reference wave signal is made variable, the image forming apparatus can control the image easily and stably.

Next, an embodiment to accomplish the second object of the present invention will be explained as follows.

In the image forming method of the present invention, the gradation property of an image can be controlled as follows: the diameter of a dot-like toner image, in other words the area of the dot-like toner image, is changed, wherein the dot-like toner image has been obtained by reversal-developing of an electrostatic latent image formed on the high γ type photoreceptor.

Figure 17:
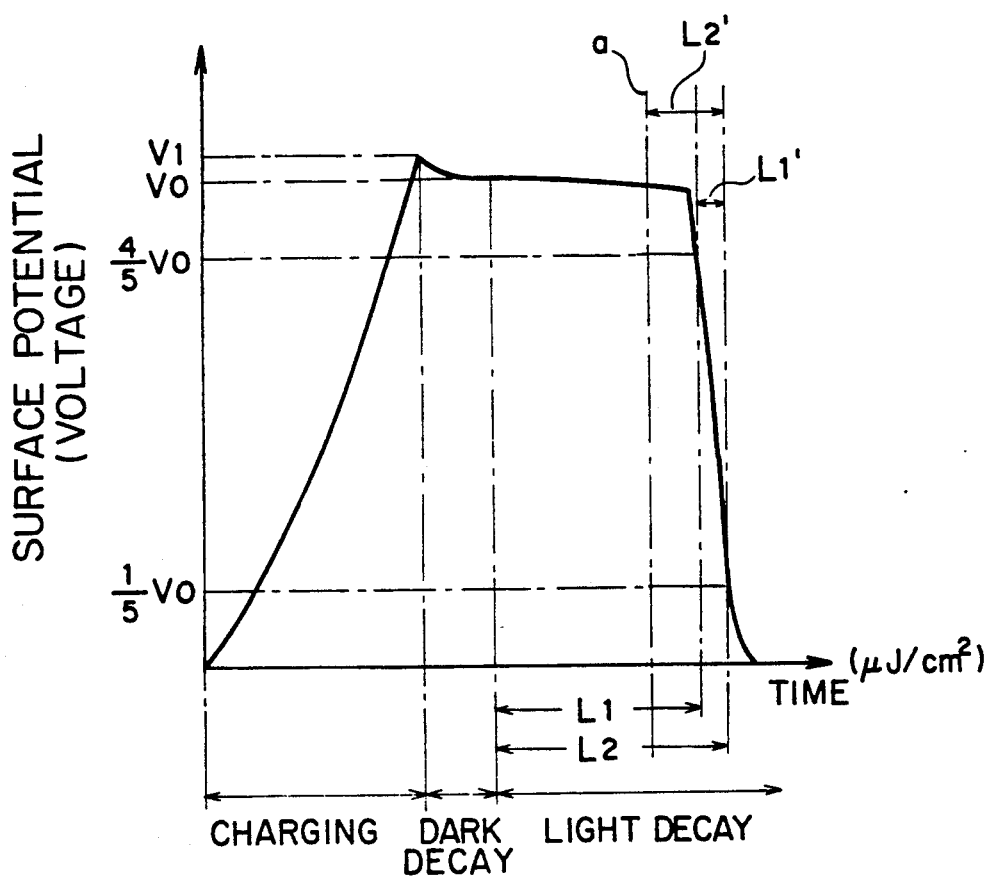
FIG. 17 is a characteristic diagram of a high γ photoreceptor which explains an embodiment to accomplish the second object of the present invention.

In the image forming method of the present invention, the amount of modulation light is reduced which is necessary to reduce the electrical potential of the high γ type photoreceptor in such a manner that: the high γ type photoreceptor is illuminated with uniform light emitted by an illuminating means before or after or simultaneously with the exposure of modulation light conducted by the optical scanning system on the aforementioned photoreceptor. As shown in FIG. 17, in the present invention, the light decay characteristic of the high γ type photoreceptor is expressed by the portion after dotted line a, so that the photoreceptor accurately responds to the amount of light of the modulated beams sent from the optical scanning system. In the manner described above, the image forming apparatus of the present invention can adjust the area of the electrostatic latent image which is formed by the modulated light sent from the optical scanning system.

In the manner described above, the gradation of images can be improved by extending the range in which the area of a dot-like toner image can be changed.

The image forming apparatus of the present invention is characterized in that: illuminating means which can illuminate with a uniform amount of light is provided between the charger and the developing unit along the entire width of the image; and the light amount $P_i$ to the half decay exposure which is necessary to reduce the electrical potential of the high γ type photoreceptor into half, is seemingly reduced so that the photoreceptor can respond to the modulation light sent from the optical scanning system and a sharp electrostatic latent image can be formed. An image of high gradation can be formed by reversal-developing of the latent image.

When the aforementioned illuminating means is provided with a variable illumination means by which the amount of illuminating light can be changed, an image of high gradation can be formed without being influenced by environmental factors in the image forming apparatus.

As an embodiment, two kinds of image forming apparatuses provided with different optical scanning systems, are explained as follows. The following two kinds of image forming apparatuses have a common structure except the optical scanning system, so that first of all the common structure will be explained.

Figure 18:
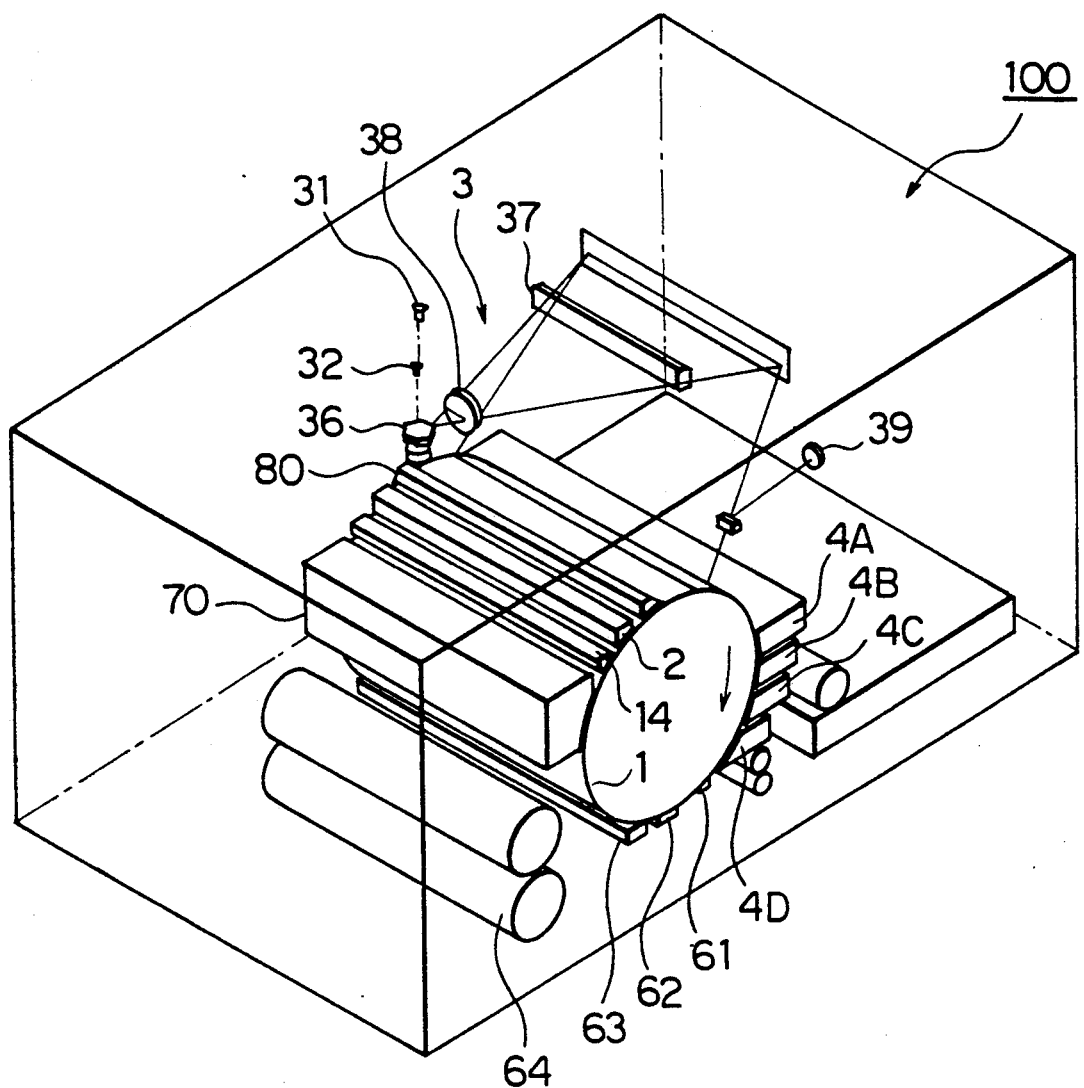
FIG. 18 is a perspective view showing the outline of the structure of an image forming apparatus of an embodiment to accomplish the second object of the present invention.

FIG. 18 is a perspective view showing the outline of the structure of the image forming apparatus of an embodiment of the present invention.

A color image forming apparatus 100 of this embodiment conducts shading-correction, gradation correction, masking correction and the like on the image density signal sent from a computer or a scanner after a photoreceptor has been uniformly charged. A dot-like electrostatic latent image is formed by a spot exposure which has been intensity-modulated or pulse-width-modulated according to a modulation signal, wherein the modulation signal is obtained by comparing an analog image density signal obtained by D/A-converting the digital image density signal obtained in the manner described above, with a reference signal. The obtained dot-like electrostatic latent image is reversal-developed by toner so that a dot-like toner image can be formed. The aforementioned exposure and development processes are repeatedly conducted so that a color toner images can be formed on a photoreceptor 1. The obtained color toner images are transferred, separated and fixed so that a multicolor image can be obtained.

The image forming apparatus 100 comprises, a drum-like photoreceptor (which will be called a photoreceptor, hereinafter) which is rotated in the direction of an arrow, a scorotron charger 2 which uniformly gives electric charge on the photoreceptor 1, an optical scanning system 3, developing units 4A, 4B, 4C, 4D which are loaded with toners of yellow, magenta, cyan and black, a pre-transfer charger 61, a scorotron transfer unit 62, a separator 63, a fixing roller 64, a cleaning unit 70, a discharger 14 and illuminating means 80 which uses infrared rays.

The illuminating means 80 lights an infrared LED array which has been aligned along the entire print width at intervals corresponding to dot density so that a uniformly charged photoreceptor 1 can be illuminated with infrared rays by one dot line. A diffusion plate is provided with the illumination surface of the LED array so that the photoreceptor 1 can be uniformly illuminated. In this case, the amount of illuminated light emitted by the illumination means 80 is controlled under the amount of light $L_1$ so that the surface electric potential of the photoreceptor 1 can not be less than $V_0$.

The illuminating means 80 seemingly reduces $L_1$ and $L_2$ showing the optical decay characteristic of the photoreceptor 1. It should be understood that the light source is not limited to an LED array, and other light sources can be used if the amount of illuminated light can be easily controlled. The illuminating means 80 is provided with a light amount regulating means which detects the fluctuation of temperature inside the apparatus and regulates the amount of illumination. Specifically, a variable illumination means is provided which is characterized in that: a surface electrometer (which is not illustrated in the drawing) is provided to the photoreceptor 1; and the surface potential caused after illumination by the illumination means 80 and the surface potential caused by optical scanning conducted by the optical scanning system 3 can be detected so that the amount of illumination can be set. In the way described above, a latent image can be formed without being influenced by environmental fluctuations inside the apparatus.

In this embodiment, color toner images are superimposed on the photoreceptor, so that the beams sent from the optical scanning system transmit the color toner images and the electric potential is lowered. Therefore, a photoreceptor, the spectral sensitivity of which is on the long wave side, is necessary. It is preferable that the uniform illuminating light emitted by a uniform illumination means 80 is infrared in the same manner as the writing-in light so that the light can transmit the color toner images. It is preferable that the region illuminated uniformly is limited to an image portion, which is effective to prevent toner from being attracted onto a non-image-forming portion of the photoreceptor due to the lowering of electric potential.

Figure 19:
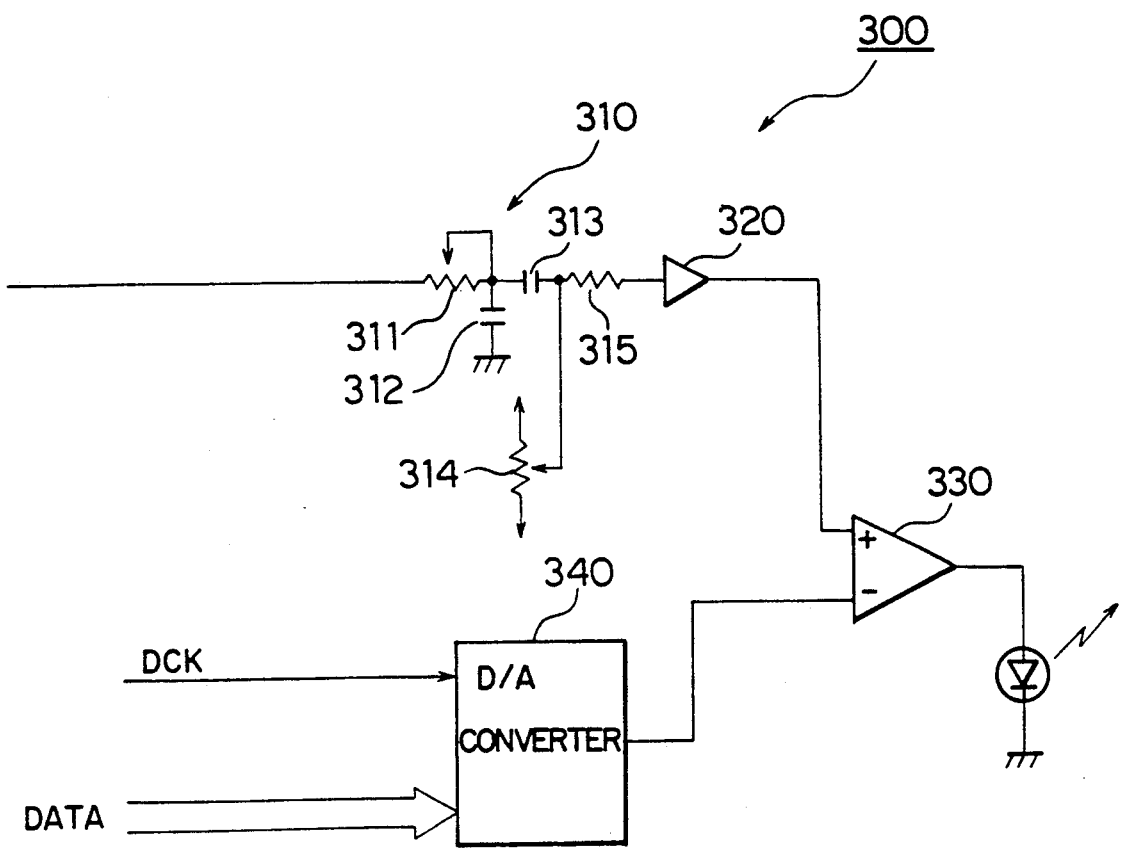
FIG. 19 is a block diagram showing the drive circuit of the first optical scanning system.
Figure 20A:
FIGS. 20a–20f are time charts which explain the operation of the first optical scanning system and the illuminating means.
Figure 20B:
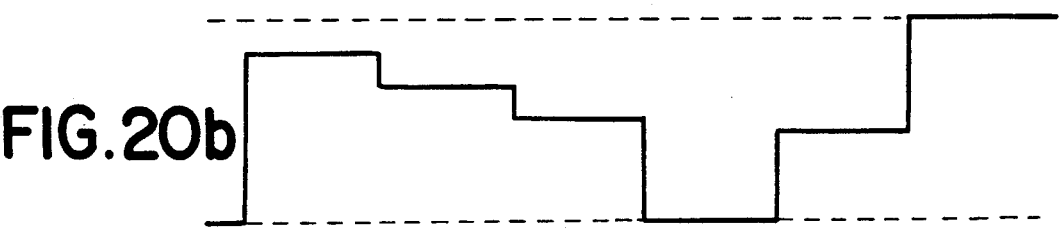
Figure 20C:
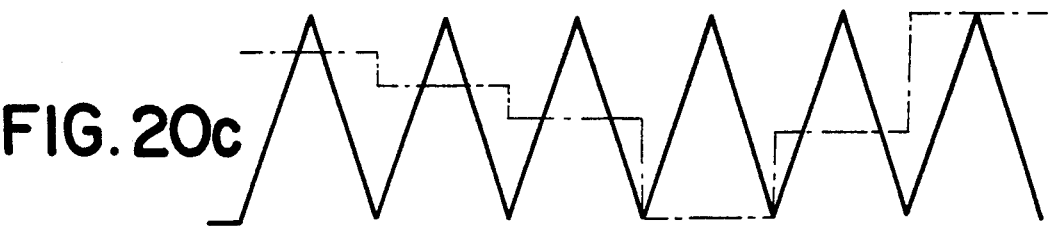
Figure 20D:
Figure 20E:
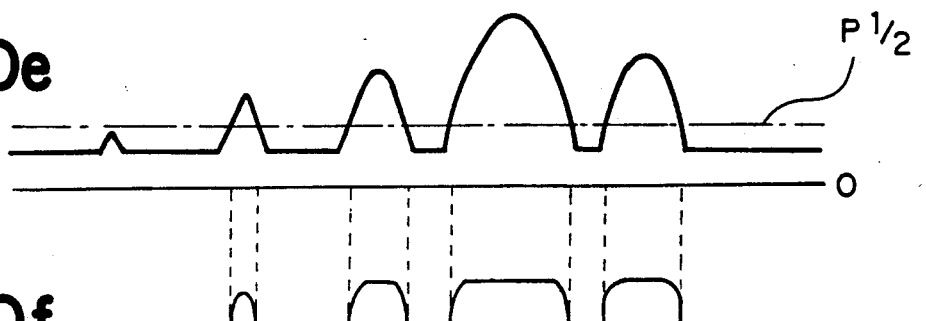
Figure 20F:

Referring now to FIG. 18 and FIG. 19, the structure and operation of the first optical scanning system will be explained as follows.

FIG. 19 is a block diagram showing a drive circuit of the optical scanning system.

As shown in FIG. 18, an optical scanning system 3 is composed of collimator 32, a polygonal mirror 36, an fθ lens 38, a tilt correction lens 37a which corrects the tilt caused by the polygonal mirror 36, and an index sensor 39. The optical scanning system 3 forms an image on the photoreceptor 1 with an oval beam according to a digital image density of a predetermined bit.

The index sensor 39 detects the surface position of the polygonal mirror 36 which is rotating at a predetermined speed. The result of the detection is used for optical scanning conducted by modulated image data according to the period of primary scanning.

A semiconductor laser 31 is made from GaAlAs. Since color toner images are superimposed on the photoreceptor 1 in order, it is preferable to conduct exposure using the light, the wavelength of which is long, so that the absorption of light by color toner can be reduced. In this case, the wavelength of the beam is 800 nm.

As illustrated in FIG. 19, a drive circuit 300 of the optical scanning system generates a pulse-width-modulation signal in accordance with an image density signal (image density data) sent from a computer or a scanner, and drives the semiconductor laser 31 with the aforementioned pulse-width-modulation signal. The signal corresponding to the amount of beam sent from the semiconductor laser 31, is fed back to the drive circuit, and the drive circuit is driven so that the amount of beam can become constant.

As illustrated in FIG. 19, the drive circuit comprises a reference wave signal generating circuit 310, a buffer circuit 320, a comparator 330, and a D/A-converter 340.

In the reference wave generating circuit 310, a triangular wave is generated by an integrator composed of a variable resistor 311 and a condenser 312. Further, the triangular wave is inputted into the buffer circuit 320 through a condenser 313 and a protective resistor 315. The reference wave generating circuit 310 is provided with two variable resistors. The variable resistor 311 is provided for adjusting the amplitude of the triangular wave. A variable resistor 314 is provided for adjusting the bias and offset of the triangular wave.

The triangular wave is inputted into the plus input terminal of a comparator 330 through the buffer circuit 320.

In the comparator 330, a comparison is made between the reference wave which has passed through the buffer circuit 320 as described above, and the analog density signal which has been obtained by D/A-converting the digital image density signal of a predetermined bit, for example of 8-bit, with the D/A converter 340 so that the data can be a binary digit. Then, the obtained pulse-width-modulation signal is outputted. This signal is used as a drive signal which turns on and off the semiconductor laser 31.

The operation of an image forming apparatus in which the first optical scanning system is adopted, will be explained as follows.

The numerals 20a–20f in FIG. 20 are time charts which explain the operations of the first optical scanning system and illumination means.

In the drawing, the numeral 20a shows a pixel clock DCK. The numeral 20b is an analog density signal which has been D/A-converted after a color correction or a gradation correction. The signal indicated by a chain line shown in the numeral 20c is an analog signal showing the density of a D/A-converted image, and the signal indicated by a solid line is a reference wave signal which is an output signal sent from a differential amplifying circuit 330. The numeral 20d is a pulse-width-modulation signal sent from the differential amplifying circuit 330. The density signal corresponding to a recording pixel is synchronized with the reference signal, and the pulse-width signal corresponding to the image density signal is generated. The numeral 20e shows an exposure dot distribution on the photoreceptor 1. The exposure dot distribution is extended due to the blur of the optical scanning system 3. The portion indicated by a broken line in the exposure dot distribution, the exposure amount of which is approximately more than the half decay exposure, is formed into a latent image due to the high γ photoreceptor characteristic. In this case, the amount of light sent from the illumination means 80 is added to the amount of light sent from the optical scanning system 3. As illustrated in FIG. 17, when a beam is sent from the optical scanning system 3, the light decay characteristic of the photoreceptor 1 seemingly becomes the right portion with regard to a chain line a in the characteristic curve, so that the photoreceptor 1 accurately responds to the amount of an optically modulated beam sent from the optical scanning system. The numeral 20f shows an image density distribution of a dot-like image formed by developing a latent image which has been composed of large and small dots in accordance with the density signal. A toner image, the gradation property of which has been improved, can be obtained by extending the diameter or the area of the dot-like toner image.

In this embodiment, an illumination means 80 which uniformly illuminates along the entire image width, is provided between the charger 2 and the developing unit 4A, and the illumination means is made to accurately respond to the amount of the optically modulated beam sent from the optical scanning system. In the way described above, an image of high gradation can be formed by reversal development.

In this case, the photosensitivity is defined by an absolute value of electric potential lowering with regard to a minute amount of exposure. The amount P of exposure of the illumination means 80 was changed so that image quality could be evaluated, and the following results could be obtained.

Mark . . . shows that the image quality is good, mark Δ shows that the image quality is a little inferior, and mark ' shows that the image quality is bad.

In this case, $P_{\frac{1}{2}}$ is the light amount to the half decay exposure necessary to reduce electric potential $V_0$ of the photoreceptor to $\frac{1}{2}$.

Concerning P, when P exceeded $P_{\frac{1}{2}}$, a remarkable image fogging and deterioration of resolving power occurred, and when P was not more than $0.2 \times P_{\frac{1}{2}}$, an adequate image was not formed. In the laser exposure, P was set to $2 \times P_{\frac{1}{2}}$.

| P | $0.2 \times P_{\frac{1}{2}}$ | $0.4 \times P_{\frac{1}{2}}$ | $0.6 \times P_{\frac{1}{2}}$ | $0.8 \times P_{\frac{1}{2}}$ | $P_{\frac{1}{2}}$ | $1.5 \times P_{\frac{1}{2}}$ |
|---|---|---|---|---|---|---|
| Image Quality | æ | ... | ... | ... | æ | ' |

Other wave-forms can be applied to the reference wave. When a reference wave was selected, which was composed of a large and small triangular waves which form one period, wherein the period coincides with the double synchronization of the recording pixel, an image of high gradation could be obtained. When the same triangular wave was used (one period became double to the period of the recording pixel), a sharp image with high resolving power could be obtained. Generally, an image reproduced by a high γ photoreceptor tends to be high contrast, and to have a plurality of peaks in one period as described above, is effective to improve the gradation property. When the same triangular wave is used as the reference wave (in this case, one period becomes the same as the period of the recording pixel), a sharp image with high resolving power could be obtained.

The period of the reference wave can be made longer than the recording pixel synchronization. For example, when the period of the reference wave is 4 times longer than the recording pixel synchronization, a preferable result can be obtained in the same way.

In this embodiment, the pulse width-modulation has been explained in which a semiconductor laser is utilized. However, it should be understood that the present invention is not limited to the specific embodiment. In the case where other light emitting elements such as an LED array are utilized, optical modulation can be conducted by a density signal which has been pulse-modulated in the same manner, so that the same effect can be provided.

The image forming process in the image forming apparatus 100 will be explained as follows.

First, the photoreceptor is optically discharged by a discharging unit 74 composed of infrared LEDs. The amount of light illuminated by the discharging means 14 is preferably more than $P_{\frac{1}{2}}$. In this embodiment, the amount of discharging light was set to $5 \times P_{\frac{1}{2}}$. To conduct this optical discharge together with a corona discharge, is preferable from the viewpoint of erasing the hysteresis of the photoreceptor. Next, the photoreceptor 1 is uniformly charged by the scorotron charger 2. After the light, the amount of which is $0.7P_{\frac{1}{2}}$, has been uniformly illuminated by the illumination means 80, the image is exposed by the beams sent from the optical scanning system 3, so that an electrostatic latent image corresponding to each color is formed on the drum-like photoreceptor 1. An electrostatic latent image corresponding to yellow is formed by the laser beams which have been optically modulated by yellow data (digital density data). The aforementioned electrostatic latent image corresponding to yellow is developed by the first developing unit 4A, and the first dot-like toner image (a yellow toner image), which is very sharp, is formed on the photoreceptor 1. This first toner image is not transferred onto recording paper, and the photoreceptor 1 is optically discharged by the discharger 14 and charged by the scorotron charger 2 again. Next, after illumination has been conducted by the illumination means 80, the laser beams are optically modulated by magenta data (digital density data), then the photoreceptor 1 is illuminated with the aforementioned modulated laser beams so that an electrostatic latent image is formed in the photoreceptor 1. This electrostatic latent image is developed by the second developing unit 4B and the second toner image (magenta toner image) can be formed. The following electrostatic latent image is developed by the third developing unit 4C so that the third toner image (cyan toner) is formed. In the manner described above, toner images of each color are laminated in sequence so that a three-color-toner image can be formed on the photoreceptor. Finally, the fourth toner image (a black toner image) is formed so that a four-color toner image in which each color is laminated in order is formed on the photoreceptor 1.

According to the image forming apparatus 100 of this embodiment, the photoreceptor is provided with an excellent high γ characteristic. Further, even when charging, exposure and development are conducted on a toner image a plurality of times in order to superimpose toner images, a latent image can be stably formed. In other words, even when a toner image is illuminated with a beam in accordance with a digital signal, a sharp dot-like electrostatic latent image without any fringe can be formed, and as a result, a sharp toner image can be obtained.

After the photoreceptor 1 has been charged by the charger 61 (this process may be omitted), these four-color toner image is transferred onto recording paper supplied by a paper supply unit by the action of the transfer unit 62.

Recording paper having a transferred toner image is separated from the photoreceptor 1 by the separating electrode 63, conveyed by a guide and a conveyance belt, conveyed into the fixing unit 64 so that the transferred image can be fixed, and delivered onto a delivery paper tray. On the other hand, after toner image transfer has been conducted, the residual toner on the photoreceptor 1 is removed by a blade, a fur brush, or a magnetic brush in the cleaning unit 70 which has been released during toner image forming. Then, the photoreceptor is discharged by a lamp or the corona discharger 74, which has not been used during toner image forming, so that the next multi-color image forming can be prepared. The lamp and the discharger 74 may be placed before the cleaning process.

When the uniform illuminating region illuminated by the illuminating means 80 is limited according to the image size, the electric potential lowering can be prevented in the non-image region, so that the adhesion of toner can be prevented in the non-image region.

Figure 21:
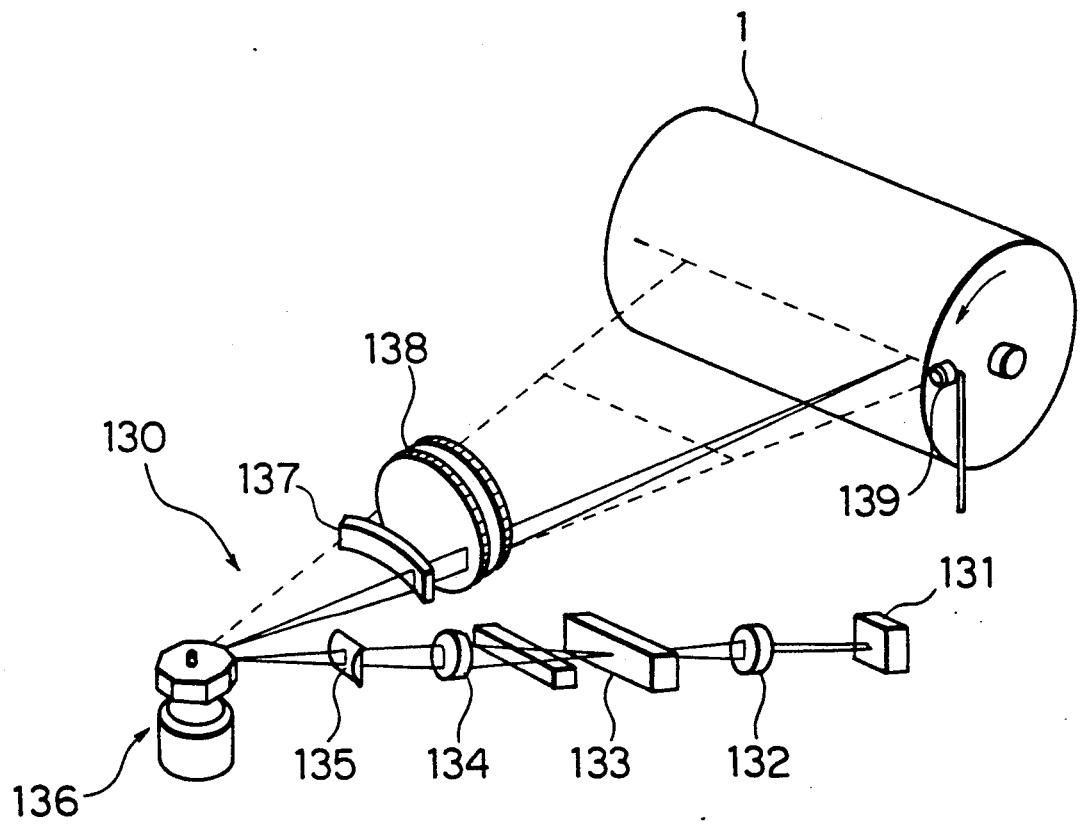
FIG. 21 is a perspective view showing the second optical scanning system.
Figure 22:
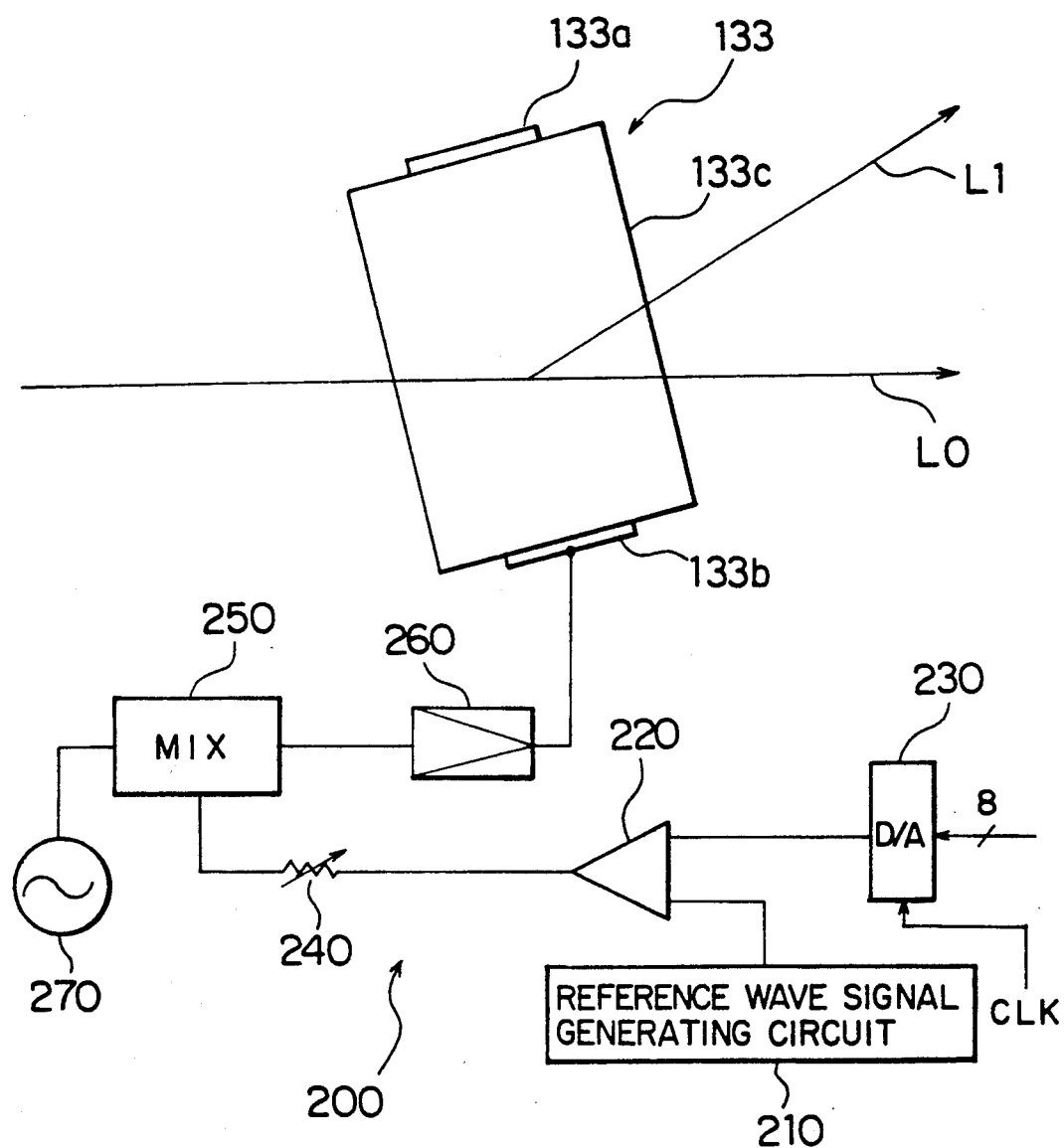
FIG. 22 is a block diagram showing a drive circuit of an optical acoustic converter of the embodiment.
Figure 23A:
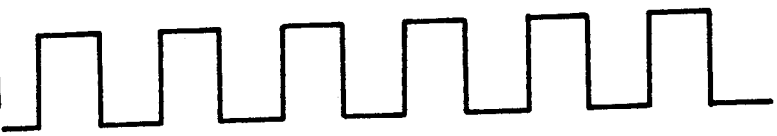
FIGS. 23a–23f are time charts which explain the image forming process by the second optical scanning system and the illuminating means.
Figure 23B:
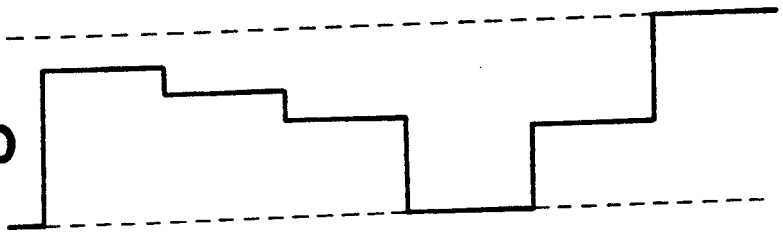
Figure 23C:
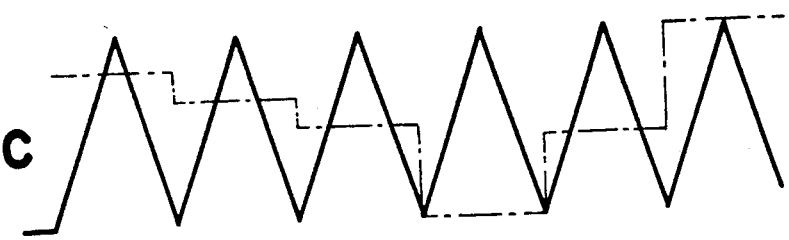
Figure 23D:
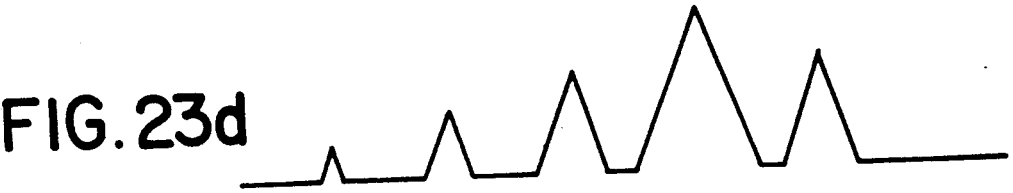
Figure 23E:
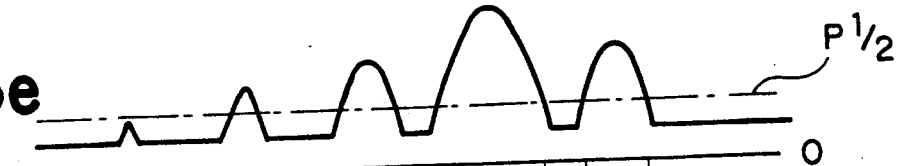
Figure 23F:
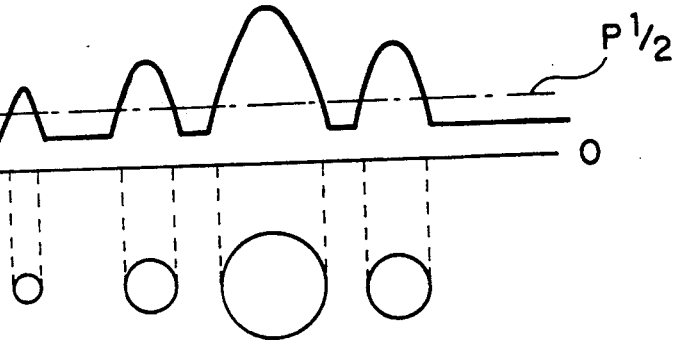

Referring now to FIG. 21 and FIG. 22, the structure of the second optical scanning system will be explained as follows.

FIG. 21 is a perspective view showing the second optical scanning system.

In order to form an electrostatic latent image, the optical scanning system is operated as follows: the circumferential surface of the photoreceptor 1, which has been uniformly charged, is exposed with a beam which has been optically modulated by an image signal obtained by intensity-modulating a density signal with a reference signal.

As illustrated in FIG. 21, the optical scanning system comprises: a semiconductor laser 131, a beam compressor 132, an acoustic optical modulator (which is called an AOM) 133, a beam expander 134, a cylindrical lens 135, a polygonal mirror 136, a toroidal lens 137, and an F$\theta$ lens 138.

An index sensor 139 detects the surface position of the poligonal mirror 136, and the result of the detection is utilized for conducting optical scanning using the modulated image data which will be described later, wherein the period of the primary scanning direction is used in the aforementioned optical scanning.

A semiconductor laser 31 is made from GaAlAs. Since color toner images are superimposed on the photoreceptor 1 in order, it is preferable to conduct exposure using the light, the wave length of which is long, so that the absorption of light by color toner can be reduced. In this case, the wavelength of the beam is 800 nm.

The beam compressor 132 reduces the diameter of the beam projected into the AMO 33 to $\frac{1}{3}$ so that the modulation band can be extended. The beam expander 34 expands the beam diameter to its original size. The polygonal mirror 136 is an optical deflector, and the cylindrical lens 135 and the toroidal lens 137, which are placed close to the polygonal mirror 136, forms an optical correction system which corrects the tilt of the polygonal mirror 136 so that the unevenness of pitch of the scanning lines caused by the tilt can be decreased.

FIG. 22 is a block diagram showing the drive circuit of the acoustic optical converter of this embodiment.

In the drawing, AMO 133 is an element which converts an electric signal including an image signal, into an optical signal. AMO 133 is composed in such a manner that: electrodes 133a, 133b are provided on both sides of a piezoelectric-crystal element 133c such as heavy flint glass, TiO$_2$, and PbMnO$_4$.

A drive circuit 200 comprises a reference wave generating circuit 210, a differential amplifier 220, a D/A converter 230, a variable resistor 240, a variable gain amplifier 250, a high band power amplifier 260, and a conveyance wave generating circuit 270.

In the drive circuit 200, an analog image density signal obtained by D/A-converting a digital image density signal of 8-bit, and a reference signal are modulated by the differential amplifier 220, and the modulated signal is inputted into the variable amplifier 250. According to this signal, a conveyance wave is amplitude-modulated by the variable gain amplifier 250, and a high frequency voltage obtained by amplifying the aforementioned signal by the high frequency band power amplifier 260, is impressed upon the electrode 133b.

AOM functions as follows: a high frequency voltage is impressed upon electrodes so that ultrasonic waves can be generated by a piezoelectric vibrator; the generated ultrasonic waves are transmitted; and a refractive index is changed by the compressional ultrasonic waves due to photo-elasticity of the medium. The change of the refractive index made by ultrasonic waves in the manner described above, functions as a phase grating with regard to the incident light, and the light which is incident on the ultrasonic wave surface by Bragg angle is diffracted. In other words, AOM 133 conducts optical modulation by controlling the occurrence of ultrasonic waves in accordance with the image density signal. In this case, primary light L1 is used as the modulated light.

The operation of the second optical scanning system and the illumination means will be explained as follows.

The numerals 23a-23f in FIG. 23 are time charts which explain the image forming process conducted by the second optical scanning means and the illumination means.

In the drawing, the numeral 23a shows pixel clock DCK to be recorded. The numeral 23b is an analog density signal showing the density of an image which has been D/A-converted after the color correction and gradation correction. A solid line in 23c is a reference wave signal sent from the reference wave generating circuit 210. The time chart 23c shows the relation between the density signal shown in 23b (which is illustrated by a broken line in 23c) and the reference wave signal (which is illustrated by a solid line in 23c) sent from the reference wave signal generating circuit 210. The numeral 23d shows an output signal sent from a differential amplifying circuit 220 in FIG. 22, in other words, the numeral 23d shows a modulation signal obtained by comparing the reference signal with the analog density signal, wherein the amplification is conducted in the manner of differential amplification. This modulation is synchronized with the density signal corresponding to a recording pixel, and the reference signal. The numeral 23e shows an exposure distribution on the photoreceptor 1 which is formed by the modulated light which has been modulated by impressing a high frequency voltage, which has been amplitude-modulated by the modulation signal, upon AM0133. In this case, the exposure distribution is the amount of emitted light multiplied by MTF of the optical system. The exposure dot distribution is extended more than the signal shown by 23d due to the blur of the optical system. As illustrated by a broken line in 23e, the portion more than the light amount to the half decay exposure, which is the amount of exposure necessary for reducing the voltage (V$_0$) of the photoreceptor to $\frac{1}{2}$, is formed into a latent image due to the high $\gamma$ photoreceptor characteristic. At this moment, the amount of light from the optical scanning system 3 is increased by adding of the light uniformly illuminated by the illumination means 80. In other words, with regard to the beam sent from the optical scanning system 130, the light decay characteristic of the photoreceptor 1 seemingly becomes the right portion with regard to a chain line a in the characteristic curve, so that the photoreceptor 1 accurately responds to the amount of an optically modulated beam sent from the optical scanning system 130.

The numeral 23f shows a dot-like image density distribution, wherein the image is obtained by developing a latent image formed by large and small dots in accordance with the density signal. In this way, the range is extended in which the dot-like area of a toner image can be varied.

In this embodiment, gradation and resolving power can be easily selected in accordance with the content of the print. In other words, adjustment can be performed in accordance with the image by changing the size of a triangular wave continuously. To be specific, when the amplitude of the reference wave is changed, the gradation can be varied. When the DC component of the reference wave is shifted together, the density can be changed. When the amplitude is changed, for example, the amplitude is made large, an image can be obtained in which gradation property has been improved. When the amplitude is the same, an image can be obtained in which a resolving power has priority.

According to the embodiment explained above, an image forming apparatus can be provided in which the high γ photoreceptor 1 is illuminated with an optically modulated beam sent from the optical scanning systems 3, or 130 so that a dot-like electrostatic latent image can be formed and the obtained latent image is reversal-developed, and by which the middle tone can be accurately reproduced by dots.

An embodiment in which intensity-modulation is performed with a semiconductor laser and an AOM, has been explained referring to FIG. 19. However, it should be understood that the present invention is not limited to the specific embodiment. For example, the following structure can be adopted: intensity modulation is performed by the differential amplifier 330 shown in FIG. 19; and an image is formed according to the time charts shown in FIG. 23. When other types of light emitting elements such as an LED array are utilized, optical modulation can be performed by an intensity-modulated image density signal in the same way, and the same effect can be obtained.

An image forming apparatus 100 can be provided in which the high γ photoreceptor 1 is illuminated with a beam sent from the optical scanning systems 3, 130 conducting optical modulation, so that a dot-like electrostatic latent image is formed, and which is characterized in that: an illuminating means is provided along the entire width of the image so that a uniform amount of light can be illuminated in order to form an image in which a middle tone can be accurately reproduced.

The amount of illuminating light by the illumination means 80 is variable, so that the photosensitivity of the photoreceptor can be practically changed. Accordingly, the illumination means 80 can be utilized as an image density regulating means.

An image forming apparatus 100 can be provided in which the amount of illuminating light emitted by the illumination means 80 is changed by a variable illuminating means so that a middle tone can be accurately reproduced by dots without being influenced by the fluctuation of environmental factors. In the image forming process in which a high γ photoreceptor is utilized, it is preferable that a uniform illumination is performed before or after image forming in order to release a trap in the photoreceptor, wherein the illumination is performed as a discharging means. It is preferable that an AC current corona discharge is utilized for the purpose described above. In the image forming system explained in this embodiment, in which charging, image exposure and development are repeatedly conducted, an optical discharging process by a discharging means 14 is adopted in order to prevent the accumulation of illuminating light emitted from the illumination means 80.

According to the present invention, an image forming apparatus can be provided in which the high γ photoreceptor is illuminated with an optically modulated beam sent from the optical scanning system so that a dot-like electrostatic latent image can be formed, and which is characterized in that a uniform illumination is conducted by an illumination means before or after, or simultaneously with the illumination of the aforementioned modulated beam in order to obtain an image in which a middle tone is accurately reproduced.

The present invention is to provide an image forming apparatus in which a middle tone can be accurately reproduced by utilizing modulated light which has been modulated by intensity-modulation or pulse-width modulation.

When the illuminating region by the aforementioned illumination means is limited to an image forming region, an image forming method can be provided by which a middle tone of an image can be accurately reproduced by dots.

An image forming apparatus can be provided in which a middle tone can be accurately reproduced by dots when the amount of illuminating light is changed by the aforementioned illumination means.

The present invention is to provide an image forming apparatus in which a high γ photoreceptor is illuminated with a modulated beam sent from an optical scanning system so that a dot-like electrostatic latent image is formed and the aforementioned latent image is reversal-developed, and which is characterized in that: an illumination means is provided so that a uniform amount of light can be illuminated along the entire image width, so that a middle tone can be accurately reproduced by dots.

The present invention is to provide an image forming apparatus in which the illuminating region is limited to an image forming region, so that a middle tone can be accurately reproduced by dots.

Further, the present invention is to provide an image forming apparatus in which the aforementioned illumination means is provided with a variable illumination means, so that a middle tone can be accurately reproduced without being influenced by the fluctuation of environmental factors.

What is claimed is:
1. An apparatus for forming an image, comprising:
a photoreceptor including an imaging surface for forming an electrostatic latent image thereon in response to an exposure light beam;
means for charging said imaging surface to a predetermined electric potential;
said photoreceptor having a light decay characteristic, wherein:
when an amount of exposure on an exposed point of said imaging surface is smaller than a given critical amount, an electric potential of the exposed point decays slightly; and
when an amount of exposure on the exposed point is larger than said given critical amount, the electric potential of the exposed point decays sharply;
image writing means, including a laser beam generator and a generator drive circuit, for scanning and exposing said imaging surface with a laser beam to write said electrostatic latent image on said imaging surface;
said generator drive circuit including a signal generator for generating a reference wave signal that has a frequency and an amplitude, and comparator means for comparing a level of an image density signal and a level of said reference wave signal, said comparator means including modulator means, responsive to the compared levels of said image density signal and said reference wave signal, for modulating said image density signal;

said laser beam generator being driven in accordance with said modulated image density signal so that when said level of said image density signal is lower than said level of said reference wave signal, said laser beam generator emits a laser beam; and said signal generator setting an amplitude of said reference wave signal such that a maximum level of said image density signal, corresponding to a white image, is lower than a maximum level of said reference wave signal so that when an image is said white image, said laser beam generator emits a laser beam that has an initial amount of exposure light that is lower than said given critical amount to thereby prevent a latent image from being formed on said imaging surface.

2. The apparatus of claim 1, wherein said reference wave signal is a triangular shaped wave signal having an apex that indicates the maximum level of said reference wave signal and having a base that indicates a minimum level of said reference wave signal.

3. The apparatus of claim 1, wherein a minimum level of said image density signal is higher than a minimum level of said reference wave signal.

4. An apparatus for forming an image, comprising:
a photoreceptor including an imaging surface for forming an electric latent image thereon in response to an exposure light;
means for charging said imaging surface to a predetermined electric potential;
said photoreceptor having a light decay characteristic, wherein:
  when an amount of exposure on a point of said imaging surface is smaller than a given critical amount, an electric potential of the exposed point decays slightly; and
  when an amount of exposure on the exposed point is larger than said given critical amount, the electric potential of the exposed point decays sharply;
exposure means for uniformly exposing said imaging surface with a light amount that is lower than said given critical amount, after the imaging surface has been charged to said predetermined electric potential; and
image writing means, including a laser beam generator and a generator drive circuit, for scanning and exposing said imaging surface with a laser beam to write said electric latent image on said imaging surface.

5. The apparatus of claim 1,
wherein said generator drive circuit modulates an intensity of said image density signal.

6. The apparatus of claim 1, wherein:
said generator drive circuit includes means for generating a high frequency wave signal; and
said generator drive circuit further includes means for amplitude modulating said high frequency wave signal on the basis of said modulated image density signal and means for driving said laser beam generator in accordance with said amplitude modulated high frequency wave signal.

7. The apparatus of claim 4,
wherein said exposure means uniformly exposes said imaging surface substantially simultaneously with the scanning and exposing of said imaging surface by said image writing means.

8. The apparatus of claim 4, wherein:
said exposure means uniformly exposes said imaging surface at a time that is one of immediately before and immediately after the scanning and exposing of said imaging surface by said image writing means.

9. The apparatus of claim 4,
wherein said exposure means uniformly exposes an image forming part of said imaging surface.

10. The apparatus of claim 4,
wherein said exposure means is adapted to change the exposure light amount.

11. The apparatus of claim 4,
wherein said generator drive circuit modulates the intensity of said image density signal.

12. The apparatus of claim 4,
wherein said generator drive circuit includes means for modulating a pulse width of said image density signal.

* * * * *